US012374191B2

(12) United States Patent
Mirjavadi et al.

(10) Patent No.: US 12,374,191 B2
(45) Date of Patent: Jul. 29, 2025

(54) ELECTRONIC GAMING SYSTEMS AND METHODS HAVING OUTCOMES RANDOMLY SELECTED FROM MULTIPLE SETS OF WINNING SYMBOL COMBINATIONS

(71) Applicant: Aristocrat Technologies, Inc., Las Vegas, NV (US)

(72) Inventors: Daniel Mirjavadi, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 368 days.

(21) Appl. No.: 17/957,482

(22) Filed: Sep. 30, 2022

(65) Prior Publication Data

US 2024/0112542 A1 Apr. 4, 2024

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
None
See application file for complete search history.

(56) References Cited

U.S. PATENT DOCUMENTS 5,833,537 A 11/1998 Barrie
5,947,820 A 9/1999 Morro
D428,399 S 7/2000 Kahn
6,097,390 A 8/2000 Marks
6,287,194 B1 9/2001 Okada
6,364,765 B1 4/2002 Walker
6,428,412 B1 8/2002 Anderson
(Continued)

FOREIGN PATENT DOCUMENTS

AU 2008202678 A1 2/2009
AU 2017279696 A1 7/2018
WO 2017205905 A1 12/2017

OTHER PUBLICATIONS

Australian Examination Report for App No. AU2019222868, dated May 22, 2020, 4 pages.
(Continued)

*Primary Examiner* — Lawrence S Galka
(74) *Attorney, Agent, or Firm* — Armstrong Teasdale LLP

(57) ABSTRACT

An electronic gaming system includes a processor configured to execute instructions stored in a memory. The instructions, when executed, cause the processor to initiate a reel game that uses a set of reels having a set of reel strips, and select a special symbol that is included in the set of reel strips from a plurality of special symbols including a first set of special symbols associated with a first pay evaluation and a second set of special symbols associated with a second pay evaluation that determines a greater number of winning symbol combinations than the first pay evaluation. Special symbols of the first set have a greater probability of being selected than special symbols of the second set. The instructions, when executed, also cause the processor to cause display of an outcome of the reel game and evaluate the outcome of the reel game.

19 Claims, 9 Drawing Sheets

(56) References Cited

U.S. PATENT DOCUMENTS

| | | | |
|---|---|---|---|
| 6,461,241 | B1 | 10/2002 | Webb |
| 6,533,658 | B1 | 3/2003 | Walker |
| 6,579,178 | B1 | 6/2003 | Walker |
| 6,726,563 | B1 | 4/2004 | Baerlocher |
| 7,175,527 | B2 | 2/2007 | Bryant |
| D582,426 | S | 12/2008 | Chen |
| 7,601,059 | B2 | 10/2009 | Bozeman |
| D656,951 | S | 4/2012 | Weir |
| D682,301 | S | 5/2013 | Dijulio |
| D682,869 | S | 5/2013 | Aroner |
| 8,460,090 | B1 | 6/2013 | Gilliland |
| D696,265 | S | 12/2013 | D'Amore |
| D696,677 | S | 12/2013 | Corcoran |
| 8,608,556 | B2 | 12/2013 | Olive |
| D701,223 | S | 3/2014 | Cho |
| D716,326 | S | 10/2014 | Lee |
| 8,957,897 | B1 | 2/2015 | Weichselbaum |
| D732,569 | S | 6/2015 | Anzures |
| D747,349 | S | 1/2016 | Park |
| D761,282 | S | 7/2016 | Bain |
| D766,961 | S | 9/2016 | Choi |
| D767,621 | S | 9/2016 | Gagnier |
| D768,154 | S | 10/2016 | Kim |
| D768,707 | S | 10/2016 | Gagnier |
| D781,908 | S | 3/2017 | Bhandari |
| D783,046 | S | 4/2017 | Dzjind |
| D789,384 | S | 6/2017 | Lin |
| 9,711,006 | B2 | 7/2017 | Kendall |
| D798,895 | S | 10/2017 | Kim |
| D802,011 | S | 11/2017 | Friedman |
| D808,422 | S | 1/2018 | Hoffman |
| D810,117 | S | 2/2018 | Lin |
| D810,123 | S | 2/2018 | McClellan |
| D816,698 | S | 5/2018 | Oldenburger |
| D819,059 | S | 5/2018 | O'Toole |
| D819,060 | S | 5/2018 | Friedman |
| D824,933 | S | 8/2018 | Harris |
| D830,406 | S | 10/2018 | Baldi |
| D833,468 | S | 11/2018 | Hsu |
| D841,047 | S | 2/2019 | Papolu |
| 10,242,534 | B2 | 3/2019 | Bryant |
| 10,262,501 | B2 | 4/2019 | Satterlie |
| D849,036 | S | 5/2019 | Fuller |
| D849,046 | S | 5/2019 | Kuo |
| D850,464 | S | 6/2019 | Satterlie |
| D855,064 | S | 7/2019 | Lei |
| 10,453,306 | B2 | 10/2019 | Crispino |
| D870,767 | S | 12/2019 | Mllafañe |
| D873,280 | S | 1/2020 | Beesley |
| D873,852 | S | 1/2020 | Pazmino |
| D873,855 | S | 1/2020 | De Regt |
| 10,535,229 | B2 | 1/2020 | Olive |
| D879,796 | S | 3/2020 | Hung |
| D881,900 | S | 4/2020 | Harmann |
| D882,625 | S | 4/2020 | Dixit |
| D887,436 | S | 6/2020 | Crandall |
| D888,089 | S | 6/2020 | Chaudhri |
| D890,200 | S | 7/2020 | Kokubo |
| D895,642 | S | 9/2020 | Hoofnagle |
| D895,661 | S | 9/2020 | Lei |
| 10,789,812 | B2 | 9/2020 | Sanborn |
| D900,123 | S | 10/2020 | Lopes |
| 10,810,840 | B2 | 10/2020 | Casey |
| D903,691 | S | 12/2020 | Olive |
| D907,652 | S | 1/2021 | Momchilov |
| D908,134 | S | 1/2021 | Liebowitz |
| D915,439 | S | 4/2021 | Chapple |
| D916,817 | S | 4/2021 | Cicchi |
| D916,922 | S | 4/2021 | Ive |
| 10,970,958 | B2 | 4/2021 | Hirai |
| D921,013 | S | 6/2021 | Boese |
| D922,409 | S | 6/2021 | Msser |
| D923,024 | S | 6/2021 | Montoya |
| D923,047 | S | 6/2021 | Montoya |
| D924,248 | S | 7/2021 | Boese |
| D924,921 | S | 7/2021 | Bowey |
| D925,575 | S | 7/2021 | Harmann |
| D926,218 | S | 7/2021 | Moreira |
| D926,778 | S | 8/2021 | Lockley |
| D927,535 | S | 8/2021 | Pazmino |
| D927,547 | S | 8/2021 | Christiaan |
| D928,197 | S | 8/2021 | Pazmino |
| D931,885 | S | 9/2021 | Davies |
| D938,972 | S | 12/2021 | Boese |
| D940,742 | S | 1/2022 | Vickers |
| D942,466 | S | 2/2022 | Degens |
| D943,609 | S | 2/2022 | Li |
| 11,263,871 | B2 | 3/2022 | Penacho |
| D949,166 | S | 4/2022 | Marks |
| D949,167 | S | 4/2022 | Marks |
| D951,272 | S | 5/2022 | Olive |
| D952,646 | S | 5/2022 | Ludwick |
| 11,450,181 | B2 | 9/2022 | Uberuaga |
| D974,398 | S | 1/2023 | Antoon |
| D975,128 | S | 1/2023 | Antoon |
| 11,676,444 | B2 | 6/2023 | Kendall |
| 2002/0094856 | A1 | 7/2002 | Bennett |
| 2002/0107072 | A1 | 8/2002 | Giobbi |
| 2003/0064793 | A1 | 4/2003 | Baerlocher |
| 2004/0087368 | A1 | 5/2004 | Gauselmann |
| 2004/0106448 | A1 | 6/2004 | Gauselmann |
| 2004/0235552 | A1 | 11/2004 | Gauselmann |
| 2004/0266520 | A1 | 12/2004 | Aida |
| 2005/0043082 | A1 | 2/2005 | Peterson |
| 2006/0003829 | A1 | 1/2006 | Thomas |
| 2006/0046830 | A1 | 3/2006 | Webb |
| 2006/0148562 | A1 | 7/2006 | Walker |
| 2007/0060254 | A1 | 3/2007 | Muir |
| 2007/0077979 | A1 | 4/2007 | Cohn |
| 2007/0243923 | A1 | 10/2007 | Seelig |
| 2008/0113734 | A1 | 5/2008 | Watkins |
| 2008/0207312 | A1 | 8/2008 | Seelig |
| 2009/0069063 | A1 | 3/2009 | Thomas |
| 2009/0093299 | A1 | 4/2009 | Acres |
| 2009/0118000 | A1 | 5/2009 | Yoshizawa |
| 2009/0197666 | A1 | 8/2009 | Visser |
| 2009/0197668 | A1 | 8/2009 | Visser |
| 2009/0264171 | A1 | 10/2009 | Acres |
| 2009/0305770 | A1 | 12/2009 | Bennett |
| 2010/0029381 | A1 | 2/2010 | Vancura |
| 2010/0323780 | A1 | 12/2010 | Acres |
| 2011/0105216 | A1 | 5/2011 | Cohen |
| 2012/0046089 | A1 | 2/2012 | Kemper |
| 2012/0122544 | A1 | 5/2012 | Roemer |
| 2013/0065665 | A1 | 3/2013 | Watkins |
| 2013/0065674 | A1 | 3/2013 | Luciano, Jr. |
| 2013/0157741 | A1 | 6/2013 | Pacey |
| 2013/0252704 | A1 | 9/2013 | Gilbertson |
| 2013/0281181 | A1 | 10/2013 | Langille |
| 2014/0018146 | A1 | 1/2014 | Zielinski |
| 2014/0057699 | A1 | 2/2014 | Pade |
| 2014/0080570 | A1 | 3/2014 | Watkins |
| 2014/0100022 | A1 | 4/2014 | Lewis |
| 2014/0135096 | A1 | 5/2014 | Aida |
| 2014/0171182 | A1 | 6/2014 | Versaci |
| 2014/0179396 | A1 | 6/2014 | Aoki |
| 2014/0248938 | A1 | 9/2014 | Tidke |
| 2014/0274282 | A1 | 9/2014 | Mastropietro |
| 2014/0274299 | A1 | 9/2014 | Kitamura |
| 2014/0274308 | A1 | 9/2014 | Guinn |
| 2014/0295942 | A1 | 10/2014 | Kendall |
| 2014/0364193 | A1 | 12/2014 | Williamson |
| 2015/0087389 | A1 | 3/2015 | Ratner |
| 2015/0094129 | A1 | 4/2015 | Acres |
| 2015/0099569 | A1 | 4/2015 | Suda |
| 2015/0141114 | A1 | 5/2015 | Davis |
| 2015/0206397 | A1 | 7/2015 | Nelson |
| 2015/0235511 | A1 | 8/2015 | Zoble |
| 2015/0262450 | A1 | 9/2015 | Elias |
| 2015/0287286 | A1 | 10/2015 | Beria |
| 2016/0086442 | A1 | 3/2016 | Hilbert |
| 2016/0104344 | A1 | 4/2016 | Meyer |
| 2016/0133100 | A1 | 5/2016 | Pececnik |
| 2016/0247361 | A1 | 8/2016 | Meyer |

(56) References Cited

U.S. PATENT DOCUMENTS

| | | | | |
|---|---|---|---|---|
| 2016/0328926 | A1 | 11/2016 | Boese | |
| 2017/0024955 | A1 | 1/2017 | Pawloski | |
| 2017/0024957 | A1 | 1/2017 | Boese | |
| 2017/0076536 | A1* | 3/2017 | Shiraishi | G07F 17/3213 |
| 2017/0092047 | A1 | 3/2017 | Hendricks | |
| 2017/0092070 | A1 | 3/2017 | Marston | |
| 2017/0169662 | A1 | 6/2017 | Froy | |
| 2017/0365127 | A1 | 12/2017 | Zoble | |
| 2018/0025585 | A1 | 1/2018 | Schmidt | |
| 2018/0075692 | A1 | 3/2018 | Hirai | |
| 2018/0082533 | A1 | 3/2018 | Hallerbach | |
| 2018/0089942 | A1 | 3/2018 | Filipour | |
| 2018/0130296 | A1 | 5/2018 | Berman | |
| 2018/0197379 | A1 | 7/2018 | Crispino | |
| 2018/0204632 | A1 | 7/2018 | Kang | |
| 2018/0225924 | A1 | 8/2018 | Cohen | |
| 2019/0043316 | A1 | 2/2019 | Selegue | |
| 2019/0051097 | A1 | 2/2019 | Marks | |
| 2019/0051099 | A1 | 2/2019 | Pawloski | |
| 2019/0130705 | A1 | 5/2019 | Nelson | |
| 2019/0304248 | A1 | 10/2019 | Bryant | |
| 2019/0355206 | A1 | 11/2019 | Kania | |
| 2020/0051374 | A1 | 2/2020 | Solaja | |
| 2020/0074784 | A1 | 3/2020 | Caputo | |
| 2020/0098221 | A1 | 3/2020 | Hendricks | |
| 2020/0160663 | A1 | 5/2020 | Berman | |
| 2020/0312086 | A1 | 10/2020 | Kendall | |
| 2020/0312087 | A1 | 10/2020 | Kendall | |
| 2020/0312095 | A1 | 10/2020 | Kendall | |
| 2020/0357240 | A1 | 11/2020 | Tam | |
| 2021/0065513 | A1 | 3/2021 | Ludwick | |
| 2021/0104127 | A1 | 4/2021 | Schaefer | |
| 2021/0110676 | A1 | 4/2021 | Davis | |
| 2021/0256811 | A1 | 8/2021 | Uberuaga | |
| 2022/0122010 | A1 | 4/2022 | Barcelos | |
| 2023/0015353 | A1 | 1/2023 | Uberuaga | |
| 2023/0033113 | A1 | 2/2023 | Penacho | |
| 2023/0169118 | A1 | 6/2023 | Aso | |
| 2024/0029517 | A1* | 1/2024 | Redick | G07F 17/3213 |

OTHER PUBLICATIONS

Office Action dated Aug. 27, 2020 for U.S. Appl. No. 16/659,177 (pp. 1-6).

Notice of Allowance dated Sep. 29, 2020 for U.S. Appl. No. 16/659,177 (pp. 1-9).

Office Action (Non-Final Rejection) dated Jan. 10, 2022 for U.S. Appl. No. 17/150,839 (pp. 1-6).

Aristocrat Technologies Australia Pty Limited, "Fu Dai Lian Lian Panda," downloaded from https://www.aristocrat.com/apac/games/ba-bao-huang-long-emperor-2-2/, 4 pp. (downloaded on Feb. 13, 2020).

Vimeo, "Fu Dai Lian Lian," downloaded from https://vimeo.com/352401309, 10 pp. (downloaded on Feb. 13, 2020).

Youtube video, "Cash Fusion—Peacock Riches," MGS Summit Macau, downloaded from https://www.youtube.com/watch?v=6jaKVWJt56Q, 1 p. (Nov. 2017).

Office Action dated May 18, 2020 for U.S. Appl. No. 16/779,540 (pp. 1-12).

Notice of Allowance dated Aug. 27, 2020 for U.S. Appl. No. 16/779,540 (pp. 1-8).

Office Action dated Jan. 14, 2021 for U.S. Appl. No. 29/722,810 (pp. 1-7).

New Game Nice Profit Fu Dai Lian Lian Dragon Slot (Aristocrat), by Kuri Slot, dated Dec. 11, 2019, youtube.com [online]. Retrieved Jan. 11, 2021 from internet <URL:https://www.youtube.com/watch?v=5kX2ZXirx_O> (Year: 2019).

Fu Dai Lian Lian, dated to Oct. 25, 2020, aristocrat-us.com [online]. Retrieved from internet <URL:https://web.archive.org/web/20201125023325/https://www.aristocrat-us.com/fu-dai-lian-1ian> (Year: 2020).

Notice of Allowance dated Feb. 18, 2021 for U.S. Appl. No. 29/722,810 (pp. 1-8).

Notice of Allowance dated Jun. 16, 2021 for U.S. Appl. No. 29/722,813 (pp. 1-9).

Julia Lemba, "Moneybag Simple Cartoon" Mar. 14, 2019 https://www.istockphoto.com/vector/moneybag-simple-cartoon-infographics-isolated-on-blue-background-moneybag-simple-gm1135787086-302281081.

Office Action dated Jun. 18, 2021 for U.S. Appl. No. 16/790,548 (pp. 1-16).

Corrected Notice of Allowability dated Jul. 8, 2021 for U.S. Appl. No. 29/722,813 (pp. 1-2).

Office Action (Non-Final Rejection) dated Jan. 7, 2022 for U.S. Appl. No. 16/830,232 (pp. 1-13).

Office Action (Non-Final Rejection) dated Jan. 21, 2022 for U.S. Appl. No. 16/830,239 (pp. 1-19).

Office Action (Final Rejection) dated Jan. 20, 2022 for U.S. Appl. No. 16/790,548 (pp. 1-16).

Office Action (Non-Final Rejection) dated Feb. 22, 2022 for U.S. Appl. No. 17/129,427 (pp. 1-10).

Office Action (Non-Final Rejection) dated Mar. 29, 2022 for U.S. Appl. No. 17/388,894 (pp. 1-22).

Office Action (Notice of Allowance and Fees Due (PTOL-85)) dated Apr. 27, 2022 for U.S. Appl. No. 17/150,839 (pp. 1-8).

Office Action (Notice of Allowance and Fees Due (PTOL-85)) dated May 17, 2022 for U.S. Appl. No. 16/790,548 (pp. 1-9).

Notice of Allowance dated May 13, 2022 for U.S. Appl. No. 29/782,345 (pp. 1-11).

Notice of Allowance dated May 16, 2022 for U.S. Appl. No. 29/809,073 (pp. 1-11).

New Game Nice Profit, by Kuri Slot, dated Dec. 11, 2019, youtube.com [online]. Retrieved May 5, 2022 from internet <URL:https://www.youtube.com/watch?v=5kX2ZXirx_0> (Year:2019).

Notice of Allowance dated Jun. 20, 2022 for U.S. Appl. No. 29/795,991 (pp. 1-9).

Notice of Allowance dated Jun. 20, 2022 for U.S. Appl. No. 29/808,901 (pp. 1-9).

Notice of Allowance dated Jun. 27, 2022 for U.S. Appl. No. 29/782,345 (pp. 1-8).

Notice of Allowance dated Jun. 27, 2022 for U.S. Appl. No. 29/809,073 (pp. 1-8).

Office Action (Notice of Allowance and Fees Due (PTOL-85)) dated Jul. 15, 2022 for U.S. Appl. No. 16/830,232 (pp. 1-9).

Office Action (Notice of Allowance and Fees Due (PTOL-85)) dated Sep. 1, 2022 for U.S. Appl. No. 16/830,239 (pp. 1-8).

Notice of Allowance dated Jul. 27, 2022 for U.S. Appl. No. 29/795,991 (pp. 1-4).

Office Action (Notice of Allowance and Fees Due (PTOL-85)) dated Jul. 25, 2022 for U.S. Appl. No. 17/129,427 (pp. 1-7).

Notice of Allowance dated Aug. 19, 2022 for U.S. Appl. No. 29/795,991 (pp. 1-7).

Notice of Allowance dated Aug. 19, 2022 for U.S. Appl. No. 29/808,901 (pp. 1-7).

Office Action (Notice of Allowance and Fees Due (PTOL-85)) dated Oct. 26, 2022 for U.S. Appl. No. 16/830,239 (pp. 1-5).

Office Action (Notice of Allowance and Fees Due (PTOL-85)) dated Oct. 19, 2022 for U.S. Appl. No. 16/830,232 (pp. 1-5).

Office Action (Notice of Allowance and Fees Due (PTOL-85)) dated Oct. 21, 2022 for U.S. Appl. No. 17/129,427 (pp. 1-7).

Office Action (Final Rejection) dated Nov. 21, 2022 for U.S. Appl. No. 17/388,894 (pp. 1-24).

Office Action (Notice of Allowance and Fees Due (PTOL-85)) dated Feb. 15, 2023 for U.S. Appl. No. 16/830,239 (pp. 1-5).

Office Action (Notice of Allowance and Fees Due (PTOL-85)) dated Jan. 31, 2023 for U.S. Appl. No. 16/830,232 (pp. 1-5).

Office Action (Notice of Allowance and Fees Due (PTOL-85)) dated Feb. 9, 2023 for U.S. Appl. No. 17/129,427 (pp. 1-7).

Notice of Allowance dated May 1, 2023 for U.S. Appl. No. 29/809,716 (pp. 1-9).

Office Action (Non-Final Rejection) dated Jun. 23, 2023 for U.S. Appl. No. 17/932,873 (pp. 1-19).

Office Action (Notice of Allowance and Fees Due (PTOL-85)) dated Aug. 18, 2023 for U.S. Appl. No. 17/388,894 (pp. 1-9).

(56) References Cited

OTHER PUBLICATIONS

Notice of Allowance dated Sep. 11, 2023 for U.S. Appl. No. 29/881,793 (pp. 1-10).
Iv_design, "Different colorful empty bowl" Nov. 6, 2017 https://www.istockphoto.com/vector/ vector-illustration-set-of-food-icons-different-colourful-empty-bowls-for-breakfast-gm870471238.
Office Action (Non-Final Rejection) dated Dec. 14, 2023 for U.S. Appl. No. 18/141,836 (pp. 1-11).
Office Action (Notice of Allowance and Fees Due (PTOL-85)) dated Jan. 9, 2024 for U.S. Appl. No. 17/932,873 (pp. 1-8).
Office Action (Notice of Allowance and Fees Due (PTOL-85)) dated Feb. 26, 2024 for U.S. Appl. No. 18/141,836 (pp. 1-8).
Australian Examination Report No. 1 issued in App. No. AU2019232939, dated Dec. 23, 2024, 7 pages.
Australian Examination Report No. 1 issued in App. No. AU2019232942 dated Feb. 13, 2025, 7 pages.
Office Action (Non-Final Rejection) dated Aug. 26, 2024 for U.S. Appl. No. 18/196,320 (pp. 1-8).
Office Action (Non-Final Rejection) dated Nov. 1, 2024 for U.S. Appl. No. 17/957,477 (pp. 1-10).
Office Action (Non-Final Rejection) dated Nov. 13, 2024 for U.S. Appl. No. 18/516,178 (pp. 1-11).

* cited by examiner

ELECTRONIC GAMING SYSTEMS AND METHODS HAVING OUTCOMES RANDOMLY SELECTED FROM MULTIPLE SETS OF WINNING SYMBOL COMBINATIONS

TECHNICAL FIELD

The field of disclosure relates generally to electronic gaming, and more specifically, to electronic gaming systems and methods that have outcomes determined by a set of winning symbol combinations randomly selected from multiple sets of winning combinations.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or pay lines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of pay lines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system includes a memory, and a processor configured to execute instructions stored in the memory. The instructions, when executed, cause the processor to initiate a reel game that uses a set of reels having a set of reel strips. The set of reel strips include a plurality of symbols. An outcome of the reel game is displayed in a reel area that includes display positions for the plurality of symbols. The instructions, when executed, also cause the processor to select a special symbol that is included in the plurality of symbols of the set of reel strips and common among each of the reel strips. The special symbol is selected from a plurality of special symbols. Each of the plurality of special symbols is associated with a pay evaluation that determines a set of winning symbol combinations formed, at least in part, by one or more instances of the respective special symbol in the display positions during the outcome of the reel game. The plurality of special symbols includes a first set of special symbols associated with a first pay evaluation and a second set of special symbols associated with a second pay evaluation that determines a greater number of winning symbol combinations than the first pay evaluation. Special symbols of the first set have a greater probability of being selected than special symbols of the second set. The instructions, when executed, also cause the processor to cause display of the outcome of the reel game in the reel area, and evaluate the outcome of the reel game including by determining whether any of the set of winning symbol combinations, determined based on the pay evaluation associated with the selected special symbol, have been formed.

In another aspect, a non-transitory computer-readable medium contains instructions embodied thereon, which when executed by a processor, cause the processor to initiate a reel game that uses a set of reels having a set of reel strips. The set of reel strips includes a plurality of symbols. An outcome of the reel game is displayed in a reel area that includes display positions for the plurality of symbols. The instructions, when executed, also cause the processor to select a special symbol that is included in the plurality of symbols of the set of reel strips and common among each of the reel strips. The special symbol is selected from a plurality of special symbols. Each of the plurality of special symbols is associated with a pay evaluation that determines a set of winning symbol combinations formed, at least in part, by one or more instances of the respective special symbol in the display positions during the outcome of the reel game. The plurality of special symbols include a first set of special symbols associated with a first pay evaluation and a second set of special symbols associated with a second pay evaluation that determines a greater number of winning symbol combinations than the first pay evaluation. Special symbols of the first set have a greater probability of being selected than special symbols of the second set. The instructions, when executed, also cause the processor to generate the outcome of the reel game to be displayed in the reel area, and evaluate the outcome of the reel game including by determining whether any of the set of winning symbol combinations, determined based on the pay evaluation associated with the selected special symbol, have been formed.

In another aspect, a computer-implemented method for providing a game on an electronic gaming system includes initiating a reel game that uses a set of reels having a set of reel strips. The set of reel strips includes a plurality of symbols. An outcome of the reel game is displayed in a reel area that includes display positions for the plurality of symbols. The method also includes selecting a special symbol that is included in the plurality of symbols of the set of reel strips and common among each of the reel strips. The special symbol is selected from a plurality of special symbols. Each of the plurality of special symbols is associated with a pay evaluation that determines a set of winning symbol combinations formed, at least in part, by one or more instances of the respective special symbol in the display positions during the outcome of the reel game. The plurality of special symbols include a first set of special symbols associated with a first pay evaluation and a second set of special symbols associated with a second pay evaluation that determines a greater number of winning symbol combinations than the first pay evaluation. Special symbols of the first set have a greater probability of being selected than special symbols of the second set. The method also includes generating the outcome of the reel game to be displayed in the reel area, and evaluating the outcome of the reel game including by determining whether any of the set of winning symbol combinations, determined based on the pay evaluation associated with the selected special symbol, have been formed.

DETAILED DESCRIPTION

Figure 1:
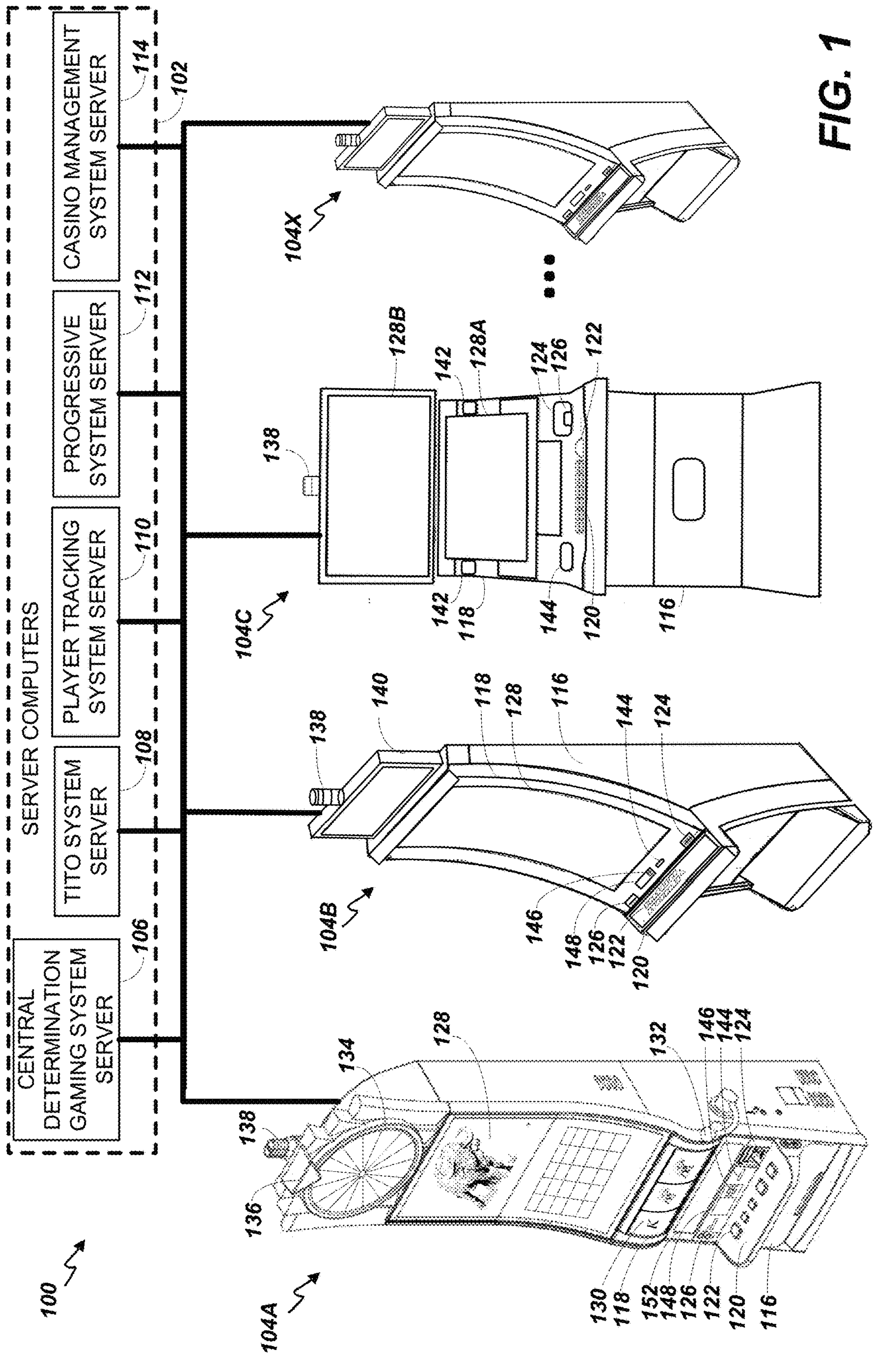
FIG. 1 is an exemplary diagram showing several EGMs networked with various gaming related servers.

In conventional reel games, a reel game outcome may include one or more instances of a special symbol (e.g., a picture symbol or a "PIC" symbol) randomly displayed within a reel area and the instances of the special symbol are evaluated according to a set of winning symbol combinations. For example, a reel game may include a single set of winning symbol combinations according to a predetermined pay evaluation, such as an "all-ways" pay evaluation or lines pay evaluation that sets a specific number of pay lines (e.g., 50 pay lines). The payout amount for a given game is determined by evaluating whether any of the winning symbol combinations are formed, at least in part, by instances of the special symbol. In conventional reel games, the pay evaluation is typically inexorably linked to the reel game, such that the set of winning symbol combinations, and particularly how winning symbol combinations are formed by instances of the special symbol, is known or fixed between plays of the reel game. Alternatively stated, conventional reel games do not change the pay evaluation used to determine the set of winning symbol combinations formed by instances of a special symbol between plays of the reel game.

The systems and methods described herein include improvements in operation, capability, and user interface ("UI") features of electronic gaming devices, as well as exemplary features of backend processing to implement the operation, capability, and UI features. The example embodiments described herein relate to use of a symbol-driven mechanic in an RNG-based gaming environment that randomly selects a set of winning symbol combinations from multiple sets of winning symbol combinations for a game instance and/or over multiple game instances. The example embodiments may be implemented, for example, in a reel game played on a gaming device, in which a reel game outcome includes symbols displayed in a reel area. The symbols include a special symbol (e.g., a picture symbol or a "PIC" symbol) selected from a plurality of special symbols (e.g., a plurality of picture symbols or "PIC" symbols), and the selected special symbol determines a set of winning symbol combinations that are formed, at least in part, by one or more instances of the selected special symbol being displayed in the reel area. The plurality of special symbols include a special symbol associated with a first pay evaluation and a special symbol associated with a second pay evaluation different from the first pay evaluation. The different pay evaluations generate different return-to-player rates during the reel game. For example, the first pay evaluation may be an all-ways pay evaluation and the second pay evaluation may be a lines pay evaluation. As described elsewhere herein, the example embodiments facilitate control over increased randomness and payout and return-to-player (RTP) rate volatility that may be caused by the different special symbols that may be used in the reel game in a computationally-effective way, while also improving usability and enhancing the user experience.

The example embodiments described herein provide improvements in electronic gaming such as, inter alia, facilitating increasing the flexibility in the number of winning symbol combinations that may be formed by instances of a special symbol being displayed during a reel game. This is achieved by selecting a special symbol for the reel game from a plurality of special symbols that are each associated with a pay evaluation used to determine the set of winning symbol combinations. Thus, upon selecting the special symbol, the set of winning symbol combinations is generated based on the pay evaluation associated with the special symbol. Thereby, the set of winning symbol combination varies between instances of the reel game. As described elsewhere herein, the special symbol may be selected from a plurality of special symbols by generating, for each reel game instance, an RNG pull (e.g., an output from a random number generator, also referred to as an "RNG outcome") in which a random number is generated and a lookup operation is performed for the random in a lookup table that includes an entry for each of the plurality of special symbols. Additionally or alternatively, the special symbol may be selected by selecting a set of reel strips from a plurality of sets of reel strips that each include one of the special symbols from the plurality of special symbols, and the set of reel strips may be selected by an RNG pull generated for each reel game instance.

Certain technical problems are associated with selecting a set of winning symbol combinations from multiple sets of winning symbol combination, each determined based on different pay evaluations, using a symbol-driven mechanic within an RNG-based gaming environment. A reel game that has multiple different sets of winning symbol combinations in an RNG-based gaming environment causes game design problems, such as increasing the degree of randomness from between instances of the reel game and/or randomly generating larger payouts. For example, as described in detail elsewhere herein, when a reel game instance includes a special symbol associated with the all-ways pay evaluation, the reel game instance potentially has more winning symbols combinations (e.g., in a 4×5 reel area, 1024 possible winning symbol combinations) formed by instances of the special symbol than reel game instances that include a special symbol associated with a lines pay evaluation that includes a specific number of pay lines (e.g., 50 pay lines/winning symbol combinations). By randomly selecting a special symbol (e.g., a PIC symbol) from special symbols associated with an all-ways pay evaluation and special symbols associated with a lines pay evaluation within a single game instance or over multiple game instances, the payout amounts between reel game instances may become more random and/or volatile. Thus, a gaming machine implementing the example embodiments described herein must include proper control functions to provide the improvements in gaming device operation/capability while complying with gaming regulations, such as avoiding secondary considerations and achieving a designated game RTP rate. These technical problems are unique to gaming technology that randomly selects a set of winning symbol combinations using a symbol-driven mechanic in an RNG-base gaming environment, and are not presented in conventional gaming devices that merely present reel games having a known or fixed set of winning symbol combinations. As conventional gaming devices have not faced such technical problems, no technical solution to these technical problems exists.

In view thereof, in order to solve the technical problems presented by randomly selecting a set of winning symbol combinations as described herein, the example embodiments described herein provide various tools for managing volatility and RTP in a computationally-effective way, while also enabling improved usability and enhanced user experience. For example, the example embodiments described herein facilitate controlling and/or managing the degree of randomness that is otherwise increased by randomly selecting a set of winning combinations in an RNG-based gaming environment. As above, the set of winning symbol combinations are selected by selecting a special symbol from a plurality of special symbols that includes one or more special symbols associated with the all-ways pay evaluation and one or more special symbols associated with a lines pay evaluation, i.e., a given number of pay lines (e.g., 50 pay lines). To manage the degree of randomness caused from having multiple sets of winning symbol combinations, various controls may be implemented. For example, a reel game may assign different special symbols to different sets of reel strips that are selected for the reel game. Each set of reel strips that includes a special symbol associated with an all-ways pay evaluation does not include a special symbol associated with a lines pay evaluation, and vice versa. The set of reel strips used for a reel game instance is selected by an RNG pull. Because the all-ways pay evaluation could generate more winning symbol combinations than using a set number of pay lines under the lines pay evaluation, weights may be applied for the RNG pull so that sets of reel strips that include a special symbol associated with an all-ways pay evaluation have a lower probability of being selected than sets of reel strips that include a special symbol associated with a lines pay evaluation, so that the RTP rate of the reel game is controlled. To further control the randomness and RTP rate of the reel game, the number of the special symbol associated with the all-ways pay evaluation may vary among sets of reel strips that include the special symbol. For example, a first set of reel strips that include the special symbol associated with the all-ways pay evaluation may have a lower total number of the special symbol, or include the special symbol in a lower concentration at discrete instances where the special symbol is located in the reel strips, than a second set of reel strips that also includes the special symbol associated with the all-ways pay evaluation, described in more detail elsewhere herein.

In view thereof, the example embodiments described herein facilitate improving gaming device operation, capability, and user interface features at least by randomly selecting a set of winning symbol combinations for a reel game. Such improvements introduce technical problems, including at least increasing randomness generated during gameplay and increasing payout and RTP rate volatility. In order to provide a technical solution to these technical problems, the example embodiments described herein provide tools that facilitate managing and/or controlling the degree of randomness and payout and RTP rate volatility during game play, for example, by randomly selecting a special symbol associated with a pay evaluation that determines the set of winning symbol combinations, adjusting weights for selecting the special symbol and/or set of reel strips that include the special symbol, and/or adjusting the number of the special symbol included on the selected set of reel strips. These control tools provide a computationally-effective way to manage volatility for a designated level of RTP for the reel game, while also improving the usability of the electronic gaming device and enhancing the user experience.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
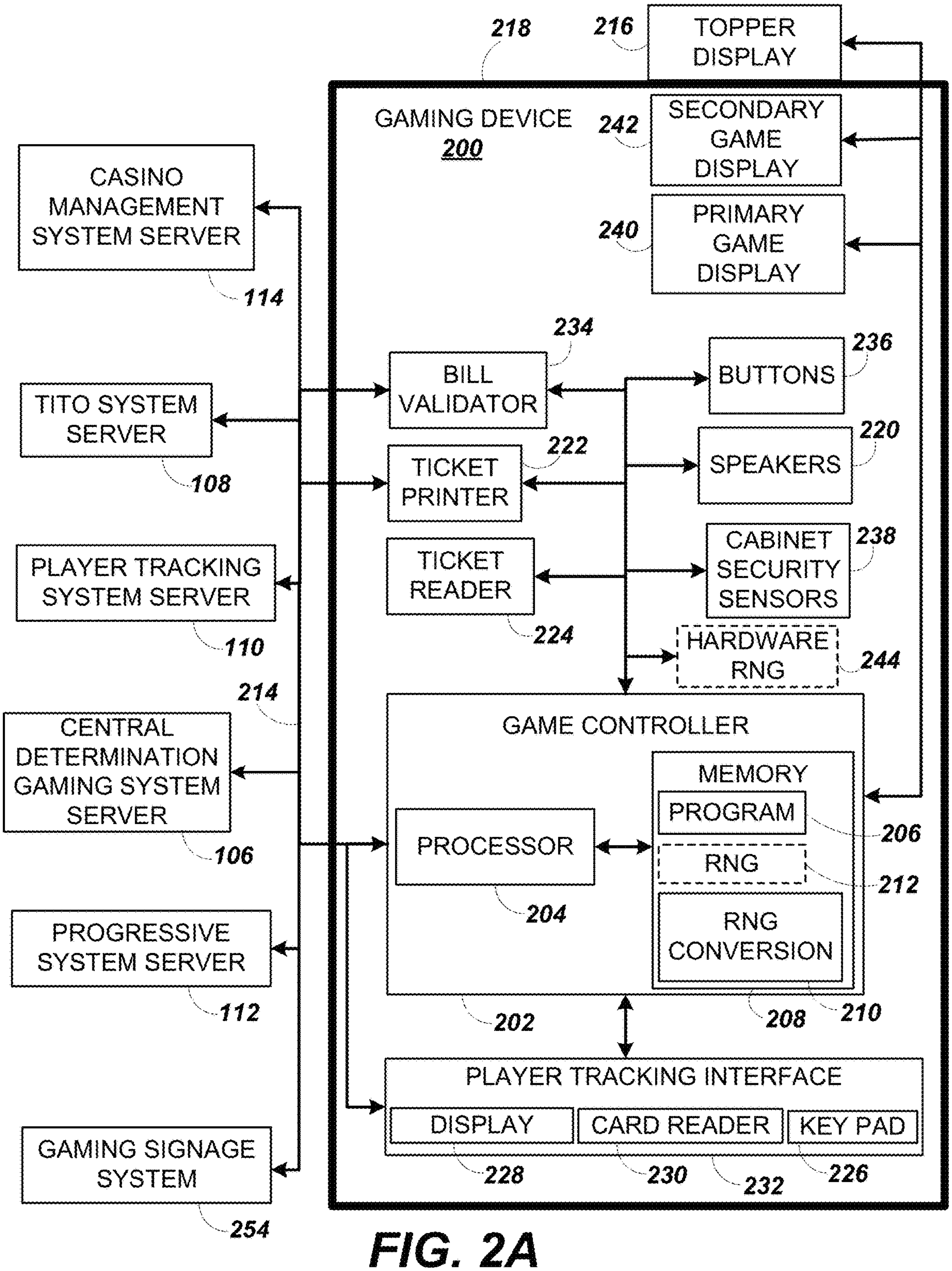
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of pay lines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
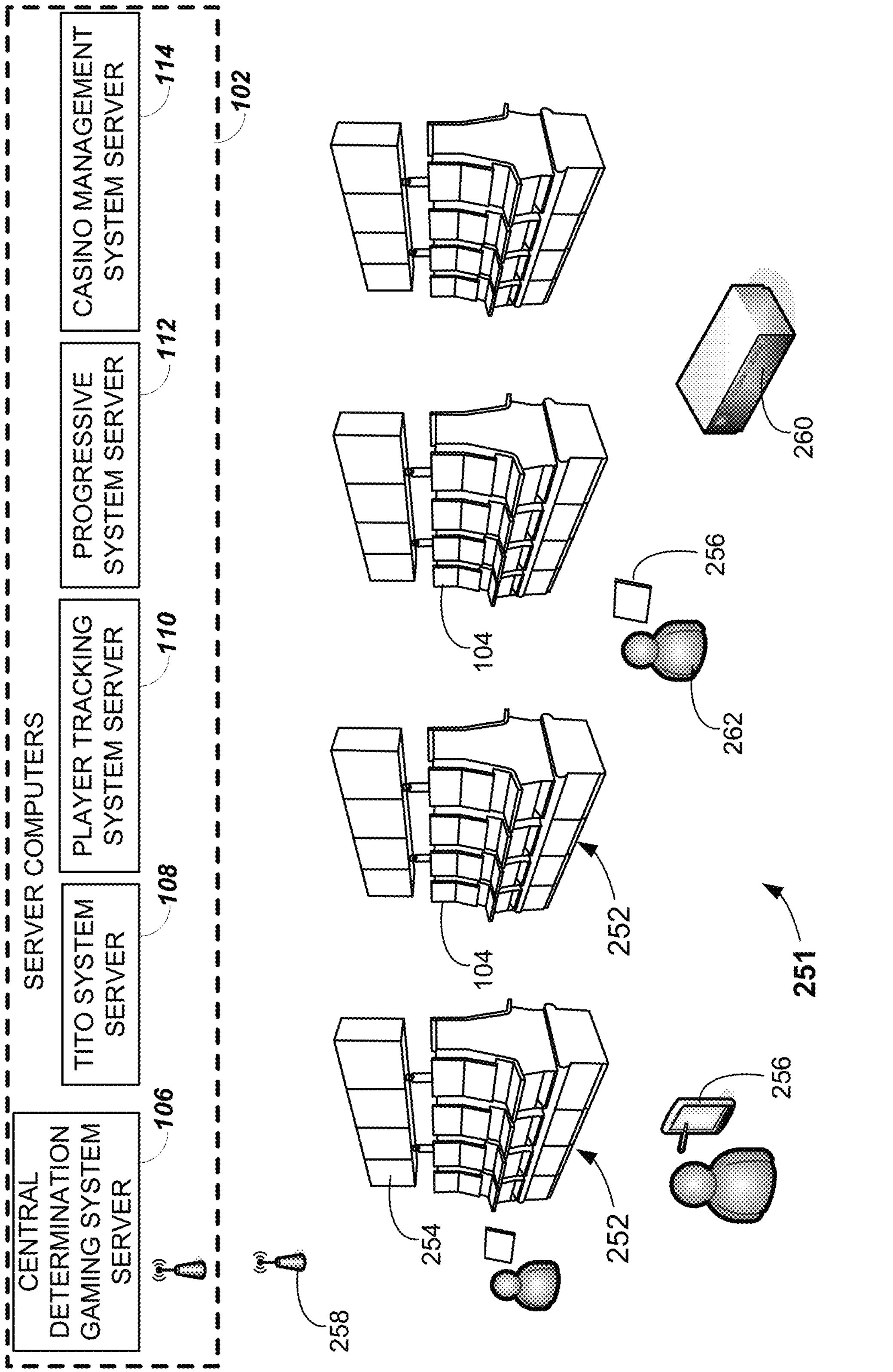
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
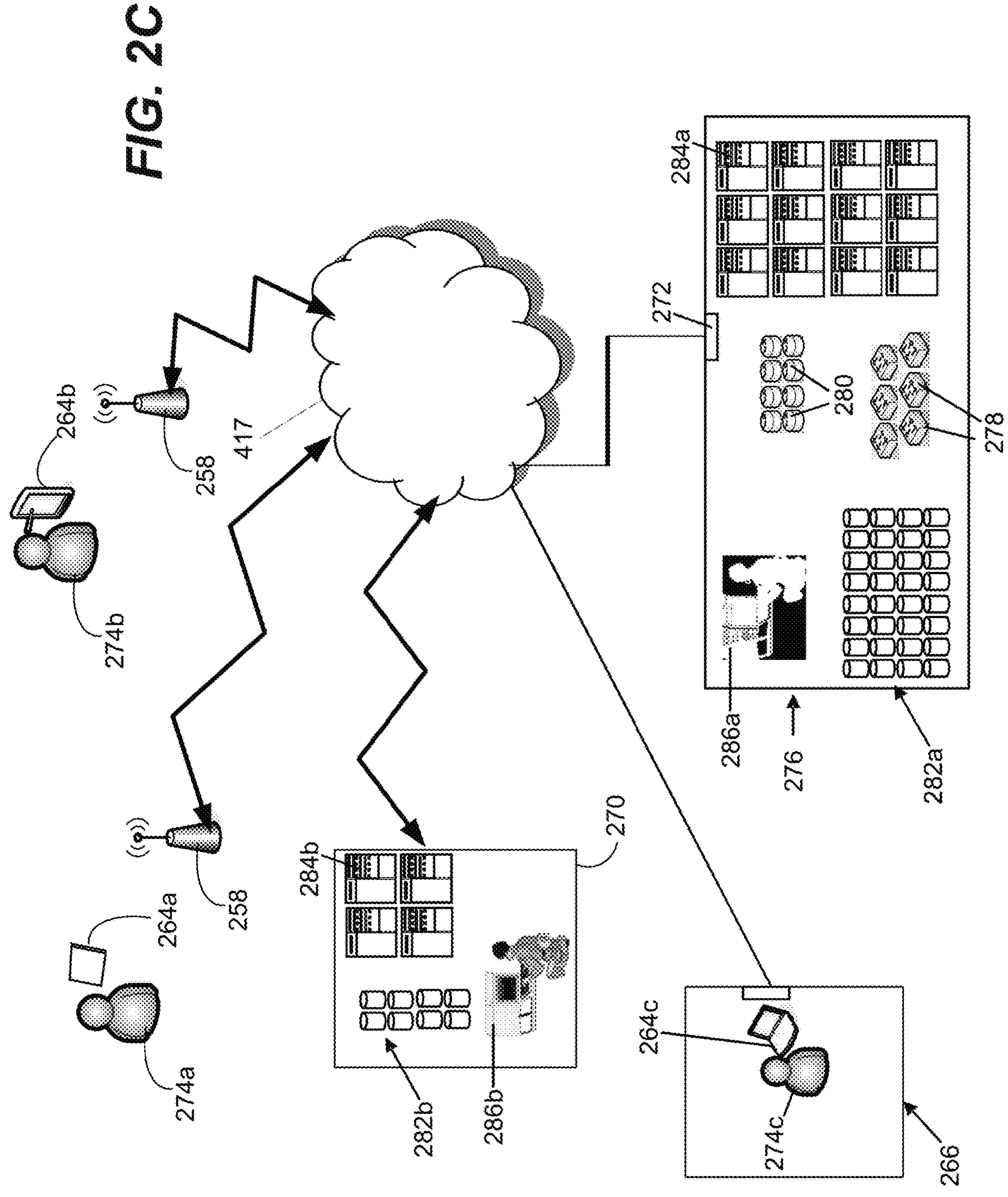
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
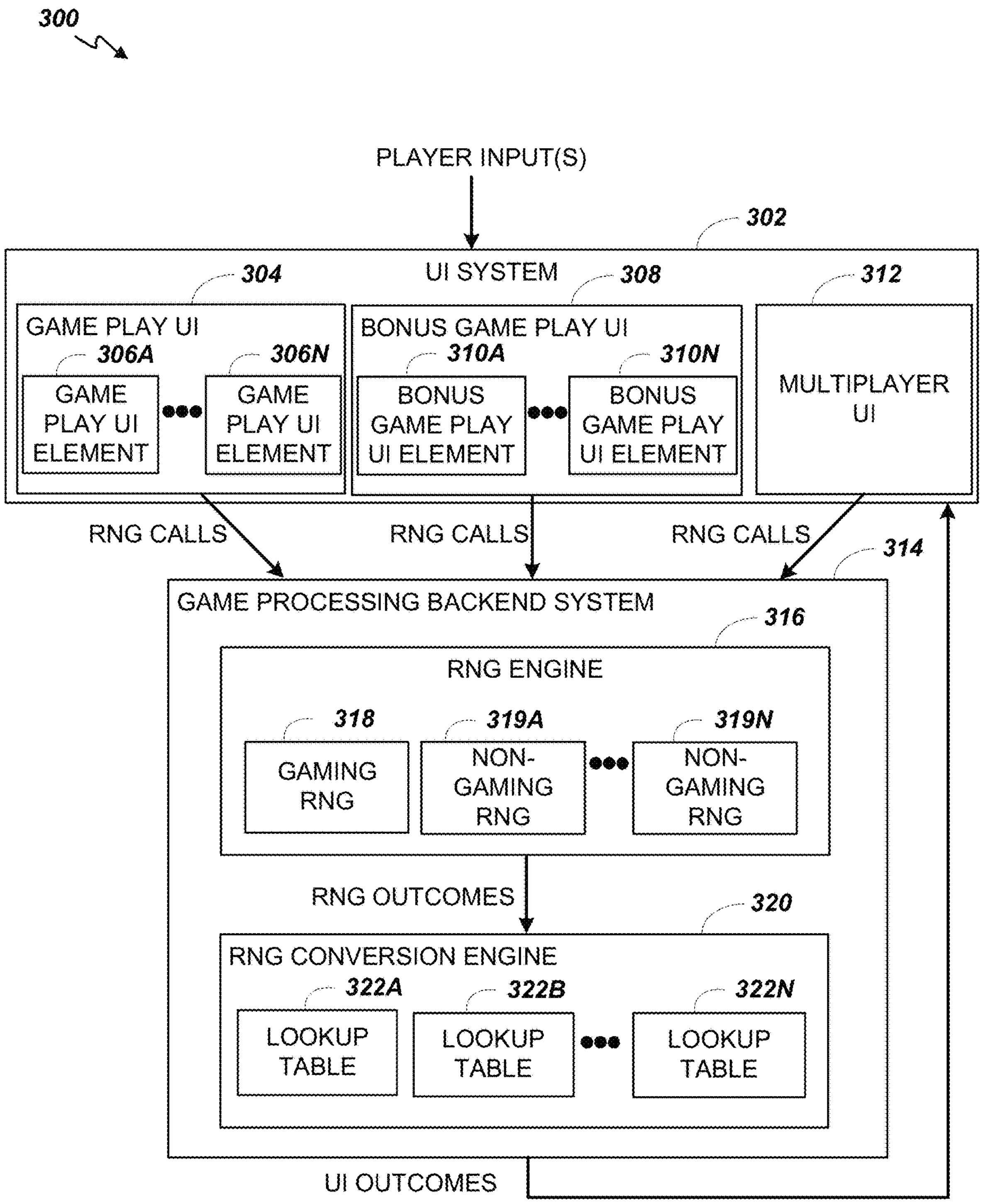
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Example Reel Games and Outcome Determinations.

Electronic gaming systems and methods described herein may provide various types of reel games or other games. A reel game may be a base reel game or bonus reel game. A base, or primary, reel game includes play that involves spinning reels. A bonus, or secondary, reel game/feature may add the possibility of winning a relatively large payout. A bonus reel game/feature may require an additional wager, but typically does not. A single play of a reel game may constitute a single complete game or wager, e.g., a single spin of the reels or a series of spins which culminate in a final aggregate outcome. In some example implementations, an electronic gaming device may conduct a base reel game, a bonus reel game, and a gateway wheel game. A reel game uses spinning reels and one or more reel areas (game windows) on a display screen.

For a reel game, a reel area encloses viewable portions of a set of reels associated with the reel area. For each of the reels, the viewable portion of the reel includes one or more positions for symbols. Thus, the reel area is a matrix of symbols on a display screen, and may be highlighted graphically to emphasize reels and symbols within the reel area. The number of reels and dimensions of the reel area depend on implementation. In some typical configurations, a reel area has an m×n configuration, with m reels and with n symbols visible per reel. For example, for a base reel game, a reel area may have a 5×3 configuration—five reels per window, with three symbols showing in the window for each of the reels, or a 5×4 configuration—five reels per window, with four symbols showing in the window for each of the reels. The reel area may span m reels in a first dimension and span n symbols in a second dimension orthogonal to the first dimension, where the value of m may be 4, 5, 6, 7, 8, or some other number of reels, and the value of n may be 2, 3, 4, 5, 6, or some other number of symbols. Typically, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels. Alternatively, a reel area may have another configuration. For example, a reel area may have different numbers of symbols visible for different reels (e.g., going left to right in a reel area, two symbols visible for a leftmost reel, three symbols visible for a second reel, four symbols visible for a center reel, three symbols visible for a fourth reel, and two symbols visible for a rightmost reel). Or, as further explained below, a reel area may have a p×q configuration, with p×q reels visible in a rectangular reel area, and a single symbol visible per reel.

For each of the reels, a reel strip includes x positions along a one-dimensional strip of symbols, where x depends on implementation. For example, x is 30, 80, 100, 200, or some other number of positions. The value of x may be the same or different for different reels (thus, different reels may have different numbers of positions). Each reel may have a data structure (e.g., array, linked list) that tracks the symbols at the respective positions of the reel strip for the reel. In some example implementations, the configuration of the symbols at the positions of the reel strips for the reels of a reel game is fixed after the reel game boots, although limited reconfiguration operations may be permitted. In other example implementations, the configuration of the symbols at the positions of the reel strips for the reels of a reel game may change dynamically after the reel game boots (e.g., depending on bet level or some other factor). Different sets of reels may be used for a base reel game and bonus reel game (or other supplemental feature such as a special mode of the base reel game). For example, for a special mode of a base reel game, more "valuable" symbols, such as wild symbols or scatter symbols, may be added to the reels of a base reel game or swapped in for other symbols on the reels.

The symbol set for reels has various types of symbols, including target symbols, special symbols, and other symbols. The symbols may be static or animated. In some example implementations, the symbol set for the reels includes a target symbol type, at least one jackpot symbol type, a wild symbol type, some number of picture symbol types, some number of minor/low symbol types, and/or some number of special symbol types. Alternatively, the symbol set for the reels may include other and/or additional symbols. The symbol set may be the same or different between a base reel game and bonus reel game (or other supplemental feature). In some example implementations, some types of symbols are dimmed out (not active) at times (e.g., symbols other than target symbols are dimmed out during a supplemental feature or bonus game).

As in a reel game with physical reels, the reels of a reel game on a display screen "spin" graphically through a reel area on the display screen when a player actuates a "spin" or "play" button, which acts as a "handle pull" event. A backend system randomly selects symbol stop positions in the respective reels, and the respective reels stop at the selected symbol stop positions, with some number of symbols visible in the game window for each of the reels. For example, for a given reel, the backend system generates a random number and determines a symbol stop position on the reel strip of the reel using the random number (e.g., with a lookup table). The backend system generates different random numbers for the respective reels that are spun. In this way, the backend system may determine which symbols of the respective reels are visible in the game window (reel area) on the display screen. In other scenarios, symbols visible in a reel area may be "transferred" from another reel area when certain conditions are satisfied. For example, symbols may be graphically transferred or otherwise added to the reel area for a bonus reel game from a base reel game upon the occurrence of certain conditions for the base reel game.

A display screen (or simply "display" or "screen") for a reel game is an area that conveys information to a viewer. The information may be dynamic, in which case, the display screen may use LCD technology, LED technology, CRT technology, or some other display technology. A main display screen (also called a primary game screen or main display) may be a display screen or an area of a display screen used to display game information related to a base reel game, such as a video representation of one or more spinning reels. A secondary display screen (also called a secondary game screen or bonus display) may be a display screen or an area of a display screen used to display secondary game information, such as animations and other graphics (e.g., metamorphic graphical elements or simply "metamorphics") associated with a bonus reel game. A credit display may display a player's current number of credits, cash, account balance, or the equivalent. A bet display may display a player's amount wagered. The credit display and/or bet display may be standalone displays, independent of the main display and bonus display. Alternatively, the credit display and/or bet display may be incorporated into the main display or bonus display. Any of the display screens may be implemented as a touchscreen, with an associated touchscreen controller. In this case, such display screens may be operated as input devices in addition to presenting information, to provide input game play decisions (e.g., actions on and selection of game presentation objects).

An electronic gaming device may award a bonus reel game, a special mode for a base reel game, or other supplemental feature to a player. A supplemental feature may enhance the electronic gaming device and the experience of players by adding elements of excitement and chance. The supplemental feature may utilize a different set of reels, display screens, controls, symbols, etc. than the base reel game in normal operation. Alternatively, the supplemental feature may reuse or reconfigure at least some of the reels, display screens, symbols, etc. of a base reel game. The supplemental feature may be started in response to satisfaction of a trigger condition. For example, as described elsewhere herein, the supplemental feature may be triggered upon the occurrence of some defined combination of symbols or threshold count of target symbols in one or more sets of reels. Alternatively, the supplemental feature may be triggered in some other way.

In some example implementations, the supplemental feature is a hold-and-spin feature, which is a type of bonus reel game. The hold-and-spin feature is activated for a reel area that encloses at least a threshold count of target symbols. During the hold-and-spin feature, reels may include symbols from the same set of symbols as a base reel game or a different set of symbols. To distinguish from regular gameplay, inactive symbols (symbols other than target symbols) may be displayed differently during the hold-and-spin feature (e.g., with lower brightness). The target symbols remain active during the hold-and-spin feature. During the hold-and-spin feature, target symbols are held in place (locked) in a reel area while reels spin for other symbol positions of the reel area. For example, each symbol position in a reel area may have its own reel. Thus, for each of the 15 symbol positions of a reel area with a 5×3 configuration of reels, the hold-and-spin feature may use a different reel. (But no reel spins in a position when a target symbol is held in that position.) Initially, a player is given r spins for the hold-and-spin feature in a reel area. For example, r is 3. Alternatively, r has some other value. When the player actuates a button to spin the reels or otherwise starts a spin of the hold-and-spin feature, all non-locked reels in the reel area spin and eventually stop, and r is decremented. If any new target symbols land in the reel area, those new target symbol(s) as well as previous target symbols are held in place (locked) and r is reset to its initial value. Locked target symbols are held until the end of the hold-and-spin feature. When r reaches 0 or all symbol positions are occupied by target symbols, an outcome is determined based on the target symbols (e.g., adding credit values of the target symbols).

Alternatively, another type of supplemental feature may be activated if a reel area includes at least a threshold count of target symbols.

A backend system may determine various outcomes and perform operations for various types of supplemental features. A UI system may then output indications of those outcomes and perform operations for various types of supplemental features. For example, for various types of events, the backend system uses a RNG to generate a random number and maps the random number to an outcome using a lookup table. FIG. 3 shows examples of lookup tables 322A . . . 322N, which are also called weighted tables. A lookup table may be implemented as any data structure that assigns probabilities to different options, in order for one of the different options to be selected using a random number. Different options are represented in different entries of a lookup table. The probabilities for different options may be reflected in threshold values (e.g., 0<RND<=40 for option 1, 40<RND<=70 for option 2, 70<RND<=90 for option 3, and 90<RND<=100 for option 4, given four options and a random number RND where 0<RND<=100). The threshold values may represent percentages or, more generally, sub-ranges within the range for a random number. In some example implementations, the threshold values for a lookup table are represented as count values (weights) for the respective entries of the lookup table. For example, the following table shows count values for the four options described above:

TABLE 1

Example Lookup Table

| Count Value | Entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values (weights) indicates the range of the options. The backend system may use a random number, generated between 1 and the sum total of the count values, to select one of the entries in the lookup table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected. The threshold values for a lookup table may be fixed and predetermined. Or, the threshold values for a lookup table may vary dynamically (e.g., depending on bet level). Or, a lookup table may be dynamically selected (e.g., depending on bet level, depending on another factor) from among multiple available lookup tables. Different parameters or choices during game play may use different lookup tables. Or, different combinations of parameters or choices may be combined in entries of a given lookup table.

After reels have landed (stopped) in a reel area, any win conditions may be detected and any win amounts may be awarded to the player (e.g., credited to the player's credit balance). In some examples, win conditions depend on a count of target symbol instances in a reel area. In other examples, win conditions are defined as combinations of symbol instances along pay lines (also called win lines) across at least a portion of a reel area on a display screen. This approach is referred to herein as a "lines pay" evaluation. Typically, a pay line is traversed from one side of the reel area to the opposite side of the reel area (e.g., left to right), using one symbol instance per reel along the pay line as part of possible combinations of symbol instances. For a round of play, when a certain combination of symbol instances appears along a pay line, a win amount corresponding to that combination of symbol instances and that pay line is awarded. Win amounts may vary according to the combination of symbol instances and according to the particular pay line along which the combination of symbol instances appears. Win amounts are typically determined according to a pay table, where the pay table comprehends the various combinations of symbol instances and pay lines that may occur (examples of win conditions). The win amount for a round of play may be a fraction of an amount wagered for that round of play for certain win conditions. For other win conditions, the win amount may be much larger than the amount wagered. The number of pay lines and base credit cost to play depends on implementation. There may be 2×, 3×, 4×, and 5×bet multipliers. Multipliers may also appear as symbols in reels. Alternatively, there could be higher bet multipliers (e.g., up to 8×), different credit options, and/or a different number of pay lines.

Depending on implementation, symbol instances along a pay line may be counted in different ways. For example, when evaluating a win condition along a pay line, symbol instances along the pay line in any reel may be counted, even if the reels are not adjacent. Alternatively, when evaluating a win condition along a pay line, only symbol instances along the pay line in adjacent reels are counted. For a given pay line, only the highest-paying combination of symbol instances is awarded. Alternatively, for a given pay line, all possible combinations of symbol instances are awarded, in the aggregate. A given symbol instance (e.g., wild symbol) is counted only towards its highest-paying combination in a given pay line. Alternatively, a given symbol instance may be counted towards multiple combinations in a given pay line.

Instead of evaluating win conditions on explicitly-designated pay lines across reels in a reel area, an award may be determined according to a "ways" approach, which is also referred to herein as "all-ways pay evaluation" or simply "all-ways evaluation." For all-ways evaluation, each possible path through designated (active) symbol display position(s) of the respective reels provides a way to win. A path is traversed from one side of the reel area to the opposite side of the reel area (e.g., left to right), using one symbol instance per reel along the path. For one symbol instance per reel in a combination, any symbol instance displayed at an active symbol display position for a given reel in the reel area may be used to form a symbol instance combination with any symbol instance displayed at an active display position of each of the other reels. As a result, the total number of ways to win is determined by multiplying the number of active display position(s) of each reel. For example, for five reels each showing three symbol instances at active display positions in a reel area, there are (3×3×3×3×3=243) ways to win for all-ways evaluation. As another example, for five reels each showing four symbol instances at active display positions in a reel area, there are (4×4×4×4×4)=1024 ways to win for all-ways evaluation. As another example, for five reels, with the first and last reels each showing four symbol instances and the other reels each showing six symbol instances at active display positions in the reel area, there are 4×6×6×6×4=3456 ways to win for all-ways evaluation. As a final example, for five reels, with the first and last reels each showing four symbol instances and the other reels each showing ten symbol instances at active display positions in the reel area, there are 4×10×10×10×4=16000 ways to win for all-ways evaluation.

For all-ways evaluation, the designated (active) symbol display positions for the respective reels may be pre-defined and static. For example, the designated (active) symbol display positions for each reel may be all of the symbol display positions enclosed in a reel area for the reel. Or, the designated (active) symbol display positions for the respective reels may change, e.g., depending on a bet amount. In some implementations, an individual reel may be selected to have all symbol display positions active or only a single symbol display position active, e.g., for different bet amounts. That is, the symbol instance displayed in any symbol display position may be used for a selected reel. For example, depending on the bet amount, all symbol display positions per reel may be active for one reel, two reels, three reels, four reels, or five reels. If all symbol display positions are not active for a reel, then only one symbol display position is active for that reel for all-ways evaluation. For example, for five reels each showing three symbol instances in a reel area, if three reels are selected, there are 3×3×3×1×1=27 ways to win for all-ways evaluation. For such all-ways evaluation, each possible path through the designated (active) symbol display position(s) of the respective reels provides a way to win. The total number of ways to win is determined by multiplying the number of active symbol display position(s) of each reel, where the active symbol display position(s) for a reel are all symbol display positions in the reel area for a selected reel but only the designated (e.g., center) symbol display position in the reel area for a non-selected reel.

In some implementations, for all-ways evaluation using a set of reels, a backend system determines which symbol display positions of the reel area are active for the reels, respectively. For example, the backend system determines which symbol display positions of the reel area are active for the reels, respectively, depending on the bet amount. Alternatively, the symbol display positions of the reel area that are active for the reels, respectively, may be pre-defined and static. In any case, for all of the possible paths through the active symbol display positions of the reel area, the backend system evaluates combinations of instances of symbols along the possible paths for one or more win conditions. Each of the possible paths uses one of the instances of symbols per reel and crosses the reel area from one side of the reel area to an opposite side of the reel area (e.g., left to right).

Example Implementations of Selecting From Multiple Sets of Winning Symbol Combinations.

Figure 4:
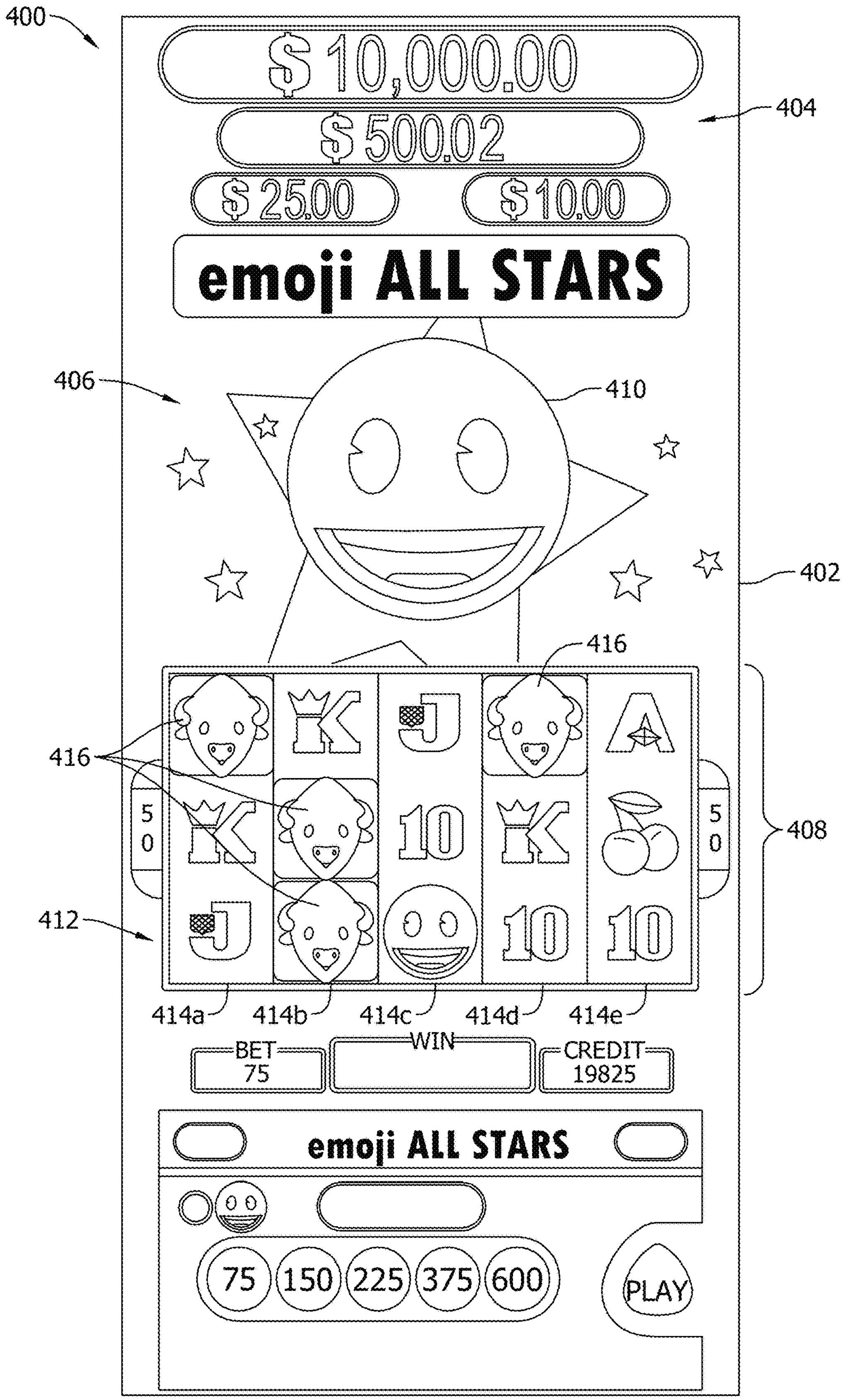
FIG. 4 illustrates a diagram that represents an example screen shot of an example instance of a reel game displayed on a display screen of an electronic gaming device.
Figure 5:
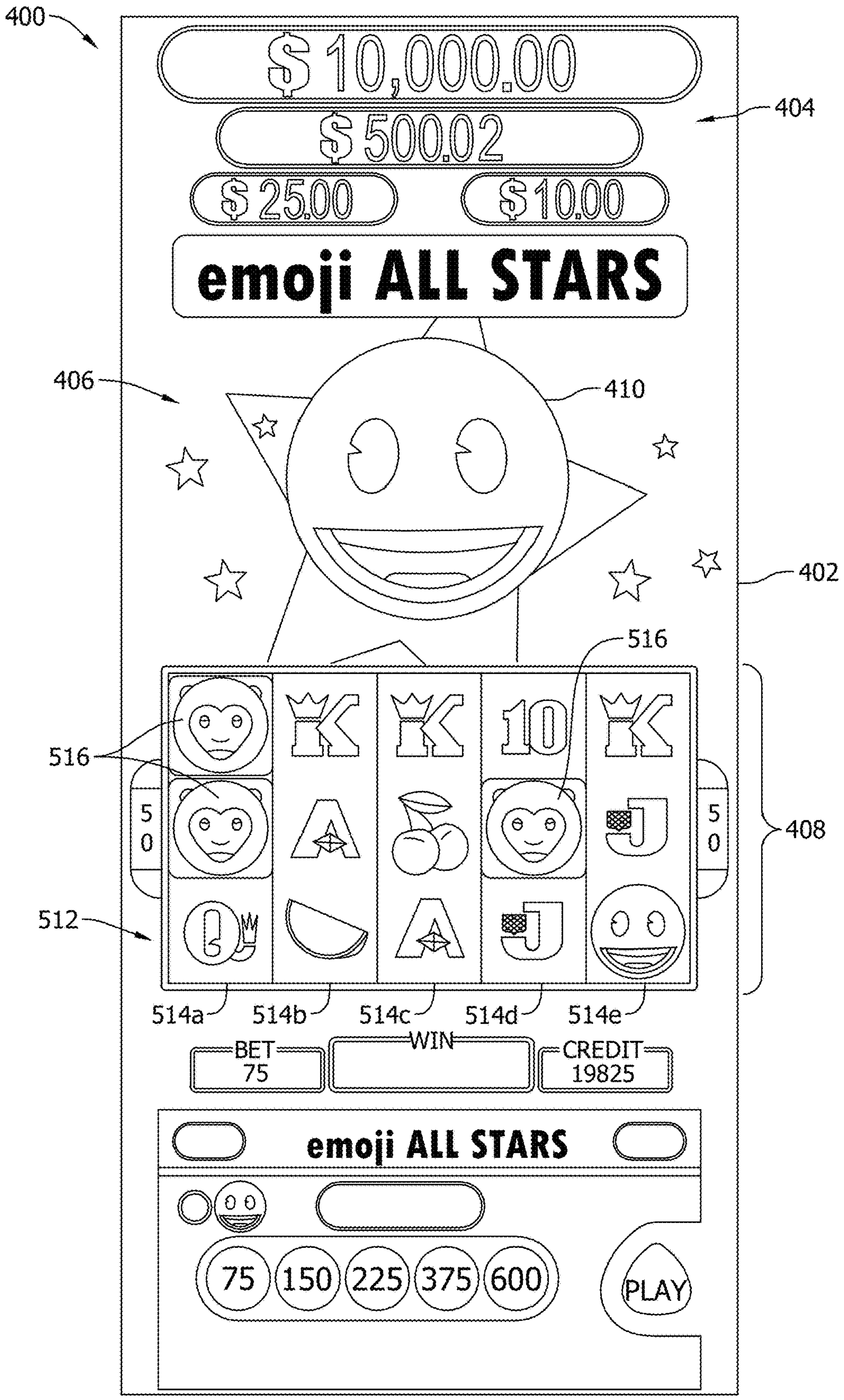
FIG. 5 illustrates a diagram that represents another example screen shot of another example instance of a reel game displayed on a display screen of an electronic gaming device.
Figure 6:
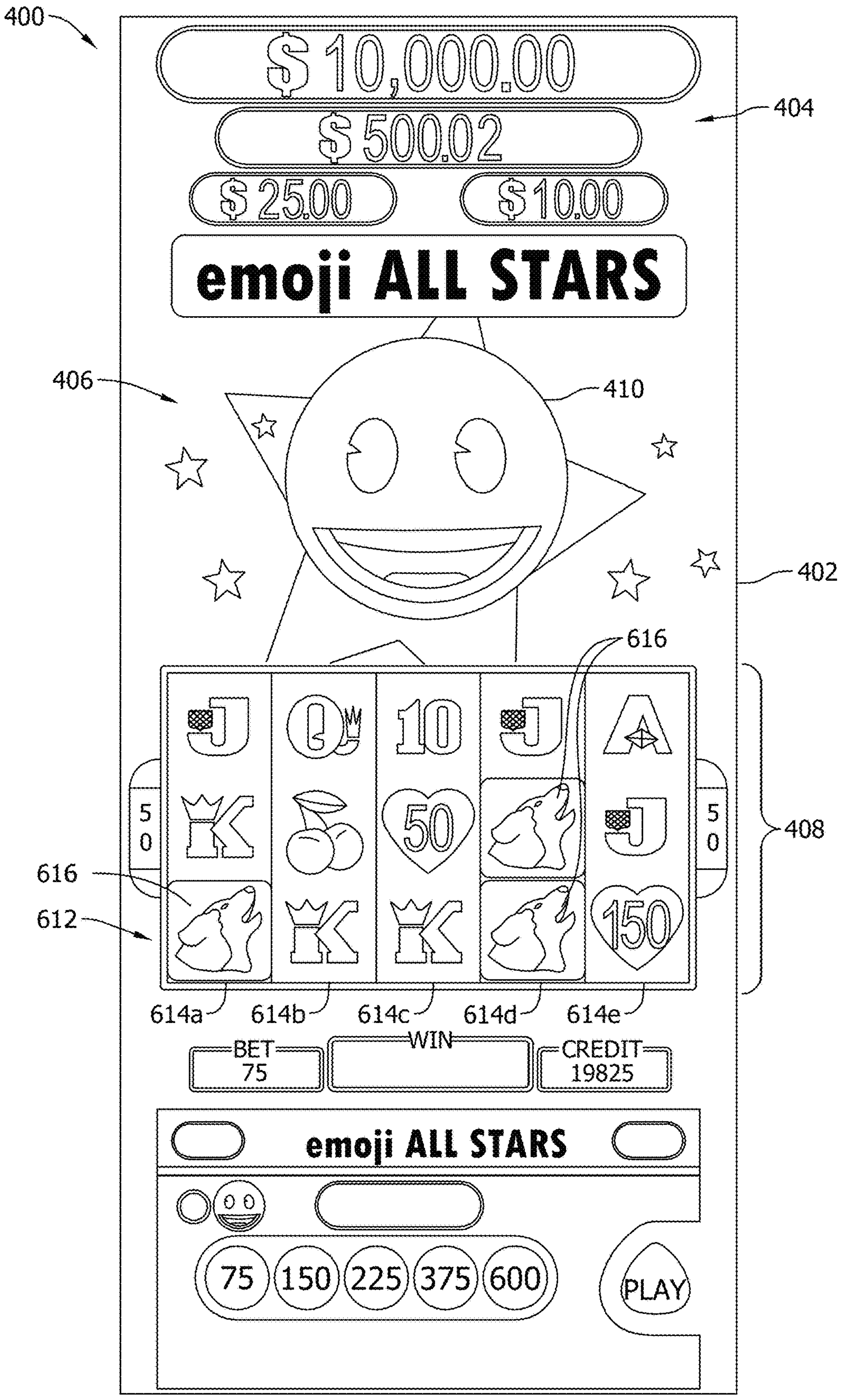
FIG. 6 illustrates a diagram that represents another example screen shot of another example instance of a reel game displayed on a display screen of an electronic gaming device.

FIGS. 4-6 are diagrams that represent example screen shots of a display screen 402 of an electronic gaming device (e.g., gaming device 104A-X in FIG. 1 or gaming device 200 in FIG. 2) on which a reel game 400 is displayed. The screen shots may be rendered on a main display screen, secondary display screen, or other display screen of an electronic gaming device. The screen shots may additionally or alternatively be rendered on a display screen of a mobile device (e.g., mobile gaming devices 256 in FIG. 2).

The display screen 402 includes a jackpot area 404, a metamorphic area 406, and a reel area 408. The metamorphic area 406 includes a metamorphic 410. The metamorphic 410 is transformed during play of the reel game 400 between multiple states or levels to indicate favorable outcomes (e.g., a winning outcome of the reel game 400 and/or a bonus game being initiated) and enhance player experience. The reel area 408 encloses viewable portions of a set of reels 412 used for the reel game 400. In the example reel game 400, the reel area 408 encloses viewable portions of five reels. For each of the set of reels, the viewable portion of each reel includes three display positions for a symbol of the reel. Alternatively, the reel area 408 may have some other configuration of reels (e.g., different dimensions).

The set of reels 412 includes a set of reel strips (e.g., a set of reel strips 414*a*-414*e* in FIG. 4, a set of reel strips 514*a*-514*e* in FIG. 5, and/or a set of reel strips 614*a*-614*e* in FIG. 6). The set of reel strips includes a plurality of symbols to be displayed in the reel area 408 during an outcome of the reel game 400. Specifically, to display an outcome of the reel game 400, the set of reels 412 are spun (graphically or physically depending on implementation) and subsequently stopped to display symbols from each of the reel strips in the display positions of the reel area 408. As above, the reel area 408 includes 3 display positions for each of the reel strips, forming a 5×3 matrix of display positions.

Each set of reel strips (e.g., the set of reel strips 414*a*-414*e* in FIG. 4, the set of reel strips 514*a*-514*e* in FIG. 5, and/or the set of reel strips 614*a*-614*e* in FIG. 6) includes a number of standard poker game symbols (specifically, royal symbols) and/or other standard symbol type. Each set of reel strips may also include jackpot symbols, wild symbols, and/or target symbols (which trigger a bonus game). Additionally, each set of reel strips includes a number of special symbols included in the symbols and common among each of the reel strips of a respective set. That is, each of the reel strips of the respective set includes one or more instances of the special symbol. The special symbol for each set of reel strips is a picture ("PIC") symbol in the example reel game 400. Although reference is made to PIC symbols as the special symbol as the description proceeds, it will be appreciated that the special symbol is not limited to PIC symbols and different special symbols may be used.

The PIC symbol used in the set of reel strips for the reel game 400 varies between instances of the reel game 400. FIGS. 4-6 illustrate different PIC symbols used in different instances of the reel game 400. Specifically, in the reel game instance of FIG. 4, the set of reel strips 414*a*-414*e* includes buffalo PIC symbols 416, in the reel game instance of FIG. 5, the set of reel strips 514*a*-514*e* includes lion PIC symbols 516, and in the reel game instance of FIG. 6, the set of reel strips 614*a*-614*e* includes timber wolf PIC symbols 616.

The PIC symbol used in the set of reel strips for each instance of the reel game 400 (or for multiple instances of the reel game 400) is selected upon initiation of an instance of the reel game 400. Specifically, the PIC symbol is selected from a plurality of PIC symbols that includes the buffalo PIC symbols 416, the lion PIC symbols 516, and the timber wolf PIC symbols 616. In some implementations, the set of reels 412 includes a set of reel strips that have dynamic symbols (symbols that may change between plays of the base game 400), and the dynamic symbols are populated (e.g., changed) to the selected PIC symbol type. Changes in the PIC symbol type to which the dynamic symbols are populated may determine whether the set of reels 412 include the set of reel strips 414*a*-414*e*, the set of reel strips 514*a*-514*e*, or the set of reel strips 614*a*-614*e*. Specifically, for a given round of play of the reel game 400, a PIC symbol type is selected and the dynamic symbols on the set of reel strips are populated (e.g., changed) to the selected PIC symbol type, thus transforming the set of reel strips for the given round play of the reel game 400 into the set of reel strips 414*a*-414*e*, the set of reel strips 514*a*-514*e*, or the set of reel strips 614*a*-614*e*, depending on the selected PIC symbol type. All or less than all of the dynamic symbols of the set of reel strips may be populated to the selected PIC symbol. Dynamic symbols that are not populated to the selected PIC symbol may be populated (e.g., changed) to a standard symbol type or other symbol type.

The PIC symbol may be selected by generating a special symbol RNG pull. To generate a special symbol RNG pull, a random number is generated, and a lookup operation for the random number is performed using a lookup table (e.g., one or more of lookup tables 322A . . . 322N in FIG. 3), by mapping the random number to an entry in the lookup table for one of the plurality of PIC symbols. The special symbol RNG pull may be generated by the RNG engine 316 which uses the gaming RNG 318 to generate one or more random numbers, which are passed to the RNG conversion engine 320, and the RNG conversion engine 320, using one or more of the random number(s) and one or more of the lookup tables 322A . . . 322N, determines (i.e., selects) the PIC symbol for the set of reel strips for the instance(s) of the reel game 400. The entry in the lookup table may also include a number of the PIC symbols to be included on each of the reel strips. Additionally or alternatively, a separate RNG pull may be generated once the PIC symbol is selected using a lookup table that includes entries for the number of the selected PIC symbol to be included on each of the reel strips.

In some implementations, selection of the PIC symbol is performed by selecting a set of reel strips from a plurality of sets of reel strips for each instance of the reel game 400 (or for multiple instances of the reel game 400) upon initiation of an instance of the reel game 400. The set of reel strips is selected from a plurality of sets of reel strips that includes the set of reel strips 414*a*-414*e*, the set of reel strips 514*a*-514*e*, and the set of reel strips 614*a*-614*e*. Each set of reel strips includes one of the PIC symbols of the plurality of PIC symbols (e.g., the set of reel strips 414*a*-414*e* includes buffalo PIC symbols 416, the set of reel strips 514*a*-514*e* includes lion PIC symbols 516, and the set of reel strips 614*a*-614*e* includes timber wolf PIC symbols 616). Thereby, selecting a set of reel strips also selects the special symbol. The set of reel strips may be selected by generating a reel strip set RNG pull. To generate a reel strip set RNG pull, a random number is generated, and a lookup operation for the random number is performed using a lookup table (e.g., one or more of lookup tables 322A . . . 322N in FIG. 3), by mapping the random number to an entry in the lookup table for one of the plurality of sets of reel strips. The reel strip set RNG pull may be generated by the RNG engine 316 which uses the gaming RNG 318 to generate one or more random numbers, which are passed to the RNG conversion engine 320, and the RNG conversion engine 320, using one or more of the random number(s) and one or more of the lookup tables 322A . . . 322N, determines (i.e., selects) the set of reel strips for the instance(s) of the reel game 400.

The outcome of the reel game 400 is evaluated (e.g., by processor 204) to determine whether the symbols displayed at the display positions of the reel area 408 correspond to a winning outcome and, if a winning outcome exists, a prize associated with the winning outcome is awarded to the player. This determination is made by comparing the symbols displayed at the display positions with winning symbol combinations (which may be stored in a pay table or similar) to determine if any of the winning symbol combinations have been formed. The winning symbol combinations include a set of winning symbol combinations that are formed, at least in part, by one or more instances of the selected PIC symbol in the display positions during the outcome of the reel game 400.

The set of winning symbol combinations that are formed, at least in part, by one or more instance of the selected PIC symbol are determined based on a pay evaluation associated with the selected PIC symbol. Each PIC symbol is associated with a pay evaluation. The plurality of PIC symbols from which the PIC symbol used during the reel game 400 includes PIC symbols associated with a first pay evaluation and PIC symbols associated with a second pay evaluation. The first pay evaluation is different from the second pay evaluation, such that the set of winning symbol combinations formed, at least in part, by instances of the PIC symbol varies based on the selected PIC symbol. That is, the set of winning symbol combinations formed, at least in part, by one or more instances of a PIC symbol associated with the first pay evaluation is different from the set of winning symbol combinations formed, at least in part, by one or more instances of a PIC symbol associated with the second pay evaluation.

In the example reel game 400, the first pay evaluation is an all-ways pay evaluation. Specifically, in the examples shown in FIGS. 4 and 5, the buffalo PIC symbols 416 and the lion PIC symbols 516 are associated with an all-ways pay evaluation. Thus, in FIG. 4, each possible path through symbol display position(s) of the respective reel strips 414*a*-414*e* that include instances of the buffalo PIC symbol 416 provides a way to win. As shown in FIG. 4, a path is traversed across the reel area 408 from one instance of the buffalo PIC symbol 416 in reel strip 414*a*, through either of the two instances of the buffalo PIC symbol 416 in reel strip 414*b*, and through the one instance of the buffalo PIC symbol 416 in reel strip 414*d*. Thus, the outcome of the reel game 400 shown in FIG. 4 includes two winning symbol combinations (two paths traversed across the reel area 408) formed by the instances of the buffalo PIC symbol 416 in the display positions of the reel area 408. Similarly, in FIG. 5, each possible path through symbol display position(s) of the respective reel strips 514*a*-514*e* that include instances of the lion PIC symbol 516 provides a way to win. As shown in FIG. 5, a path is traversed across the reel area 408 from either of the two instances of the lion PIC symbol 516 in reel strip 514*a*, and through the one instance of the lion PIC symbol 516 in reel strip 514*d*. Thus, the outcome of the reel game 400 shown in FIG. 5 includes two winning symbol combinations (two paths traversed across the reel area 408) formed by the instances of the lion PIC symbol 516 in the display positions of the reel area 408.

In the example reel game 400, the second pay evaluation is a lines pay evaluation. The timber wolf PIC symbols 616 shown in FIG. 6 are associated with the lines pay evaluation. The lines pay evaluation determines winning symbol combination along a number of fixed or predetermined pay lines (e.g., 50 pay lines). Thus, in FIG. 6, winning symbol combinations are formed, at least in part, by instances of the timber wolf PIC symbols 616 where the timber wolf PIC symbols 616 form a path traversed across the reel area 408 that matches at least one of the fixed or predetermined pay lines. The timber wolf PIC symbols 616 may form a path across the reel area 408 in combination with other instances of the timber wolf PIC symbols 616 and/or in combination with instances of other symbols of the reel strips 614*a*-614*e* (e.g., in combination with instances of royal symbols).

Although not central to the present disclosure, it will be appreciated that other winning symbol combinations of the reel game 400 may be formed without instances of the selected PIC symbol. For example, winning symbol combinations may be paths traversed across the reel area 408 formed by instances of the royal symbols included in the set of reel strips. In the example reel game 400, winning symbol combinations that are formed by instances of symbols other than PIC symbols (e.g., royal symbols) are determined by a lines pay evaluation and match a number of fixed or predetermined pay lines (e.g., 50 pay lines). Moreover, where a set of reel strips is selected from a plurality of sets of reel strips, each of the sets of reel strips that may be used for the reel game 400 may include the same symbols other than the PIC symbols, and the same number of fixed or predetermined pay lines for the other symbols are used for each instance of the reel game 400 may be used. In this regard, the number of winning symbol combinations may vary based solely on the different PIC symbol that is selected and/or included in the selected set of reel strips for each instance (or multiple instances) of the reel game 400. That is, the number of winning symbol combinations of an instance of the reel game 400 varies based on the set of winning symbol combinations that are formed, at least in part, by one or more instances of the selected PIC symbol and determined based on the pay evaluation associated with the selected PIC symbol.

Instances of the reel game 400 in which a selected PIC symbol is associated with all-ways pay evaluation (e.g., the buffalo PIC symbols 416 and/or the lion PIC symbols 516) may have a greater number of possible winning symbol combinations than instances of the reel game 400 in which a selected PIC symbol is associated with a lines pay evaluation. To illustrate, in the example reel game 400 that includes the reel area 408 forming a 5×3 matrix of display positions, the set of winning symbol combinations determined by an all-ways pay evaluation for instances of the PIC symbol has 3×3×3×3×3=243 ways to win. Under the lines pay evaluation, the number of ways to win in the set of winning symbol combinations is set by the number of known or predetermined pay lines under that evaluation (e.g., 50 pay lines). In this regard, the PIC symbol that is selected and/or included in a selected set of reel strips generates a return-to-player (RTP) rate for the instance of the reel game 400 that is different from an RTP rate of an instance of the reel game 400 with a different PIC symbol associated with a different pay evaluation. By randomly selecting the PIC symbol and/or the set of reel strips that include the PIC symbol, the RTP rate and the payout amount incurred during play of the reel game 400 may become more random and/or volatile.

In view thereof, various controls may be implemented to facilitate complying with gaming regulations, such as avoiding secondary considerations and achieving a designated game RTP rate. For each instance of the reel game 400, only one type of PIC symbol is selected. Thereby, instances where multiple PIC symbols each associated with an all-ways pay evaluation are selected, and instances where a PIC symbol associated with an all-ways pay evaluation and a PIC symbol associated with a lines pay evaluation, may be avoided, providing control over the RTP rate generated in each instance of the reel game 400. Selecting a single type of PIC symbol may be implemented by selecting a single type of PIC symbol from a plurality of types of PIC symbol to be included in the set of reel strips and/or by selecting a set of reel strips from a plurality of reel strips, where each of the plurality of reel strips includes only a single type of PIC symbol (e.g., either a PIC symbol associated with an all-ways pay evaluation or a PIC symbol associated with a lines pay evaluation). In each implementation, additional controls may be provided to facilitate controlling randomness and the generated RTP rate, such as by controlling a number of the selected PIC symbol included in the set of reel strips used for the reel game 400 to control the number of instances where a winning symbol combination may be formed.

For example, in implementations where the type of PIC symbol is selected from a plurality of types of PIC symbol by generating a special symbol RNG pull and dynamic symbols on a set of reels are populated (e.g., changed) to the selected PIC symbol type, described above, the lookup table may be weighted such that PIC symbols associated with a lines pay evaluation have a greater probability of being selected than PIC symbols associated with an all-ways pay evaluation. To illustrate, reference is made to Table 2 shown below which shows an example lookup table used for a special symbol RNG pull that is weighted to favor selection of PIC symbols associated with a lines pay evaluation. The lookup table includes entries for each of a plurality of PIC symbols (e.g., the buffalo PIC symbol 416, the lion PIC symbol 516, and the timber wolf PIC symbol 616). The number of entries may vary with the number of PIC symbols included in the plurality of PIC symbols. As described above for Table 1, the probabilities for each entry for each PIC symbol may be reflected in threshold values, and the threshold values are adjusted such that the timber wolf PIC symbol 616 has a greater probability of being selected than either of the buffalo PIC symbol 416 or the lion PIC symbol 516 (e.g., 0<RND<=50 for the timber wolf PIC symbol 616, 50<RND<=65 for the buffalo PIC symbol 416, and 65<RND<=100 for the lion PIC symbol 516):

TABLE 2

Example Lookup Table for Special Symbol RNG Pull

| Count Value | Entry |
|---|---|
| 50 | < timber wolf PIC symbol, number on reel strip 614a, . . . > |
| 15 | < buffalo PIC symbol, number on reel strip 414a, . . . > |
| 35 | < lion PIC symbol, number on reel strip 514a, . . . > |

In the example shown in Table 2, each entry includes both the PIC symbol selected and the number of the selected PIC symbol to be included on each reel strip. For example, the entry for the timber wolf PIC symbol 616 also indicates the number of timber wolf PIC symbols 616 that are included on each of the reel strips 614*a*-614*e*. Likewise, the entries for the buffalo PIC symbol 416 and the lion PIC symbol 516 also indicate the number of the respective PIC symbol that are included on each of the reel strips 414*a*-414*e* and 514*a*-514*e*, respectively. In this regard, further control may be facilitated, in particular by further controlling the probability that an all-ways pay winning symbol combination will be formed by instances of the selected PIC symbol. This may be balanced with the probability that the PIC symbol associated with the all-ways pay evaluation will be selected by the special symbol RNG pull. For example, as shown Table 2, the lion PIC symbol 516 has a greater probability of being selected than the buffalo PIC symbol 416. The number of the buffalo PIC symbol 416 included on the reel strips 414*a*-414*e* may be increased relative to the number of the lion PIC symbol 516 included on the reel strips 514*a*-514*e* given that the buffalo PIC symbol 416 has a lower probability of being selected. The number of the PIC symbol may alternatively be selected by a separate RNG pull. For example, upon selecting the PIC symbol for an instance of the reel game 400, a separate lookup operation using a separate lookup table with various entries for a number of the PIC symbol to be included on the respective set of reel strips may be performed. As above, the dynamic symbols that are not populated (e.g., changed) to the selected PIC symbol (which may be the case where the number of PIC symbols included in the lookup table entry is less than the number of dynamic symbols on one or more of the reel strips), may be populated to a standard symbol type or some other symbol type.

Furthermore, the phrase "number of the PIC symbol" and its equivalents, as used herein, may refer to the total number of the respective PIC symbol included on the respective set of reel strips, as well as the concentration of the PIC symbol at discrete instances where the PIC symbol is located in the reel strips. In the latter case, instances where "stacks" of the PIC symbol (i.e., a vertical array of two or more PIC symbols) occur on one or more reel strips may vary based on the PIC symbol selected. For example, where a PIC symbol associated with a lines pay evaluation is selected, a greater number of instances of stacks of the PIC symbol may be provided on the respective set of reel strips as compared to the case where a PIC symbol associated with an all-ways pay evaluation is selected. This is because a greater number of instances of stacks of the PIC symbol associated with an all-ways pay evaluation may cause greater payout volatility and increase the RTP rate as more paths across the reel area 408 are created. Moreover, a number of instances of stacks of the PIC symbols associated with an all-ways pay evaluation may vary between these types of PIC symbols (e.g., the number of instances of stacks may increase for a PIC symbol associated with an all-ways pay evaluation having a lower probability of being selected).

In implementations where the PIC symbol is selected by selecting a set of reel strips from a plurality of sets of reel strips by generating a reel strip set RNG pull, described above, the lookup table may be weighted such that sets of reel strips that include a PIC symbol associated with a lines pay evaluation have a greater probability of being selected than sets of reel strips that include a PIC symbol associated with an all-ways pay evaluation. To illustrate, reference is made to Table 3 shown below which shows an example lookup table used for a reel strip set RNG pull that is weighted to favor selection of sets of reel strips that include PIC symbols associated with a lines pay evaluation. The lookup table includes entries for each of a plurality of sets of reel strips (e.g., the set of reel strips 414*a*-414*e*, the set of reel strips 514*a*-514*e*, and the set of reel strips 614*a*-614*e*). The number of entries may vary with the number of sets of reel strips included in the plurality of sets of reel strips. As described above for Table 1, the probabilities for each entry for each set of reel strips may be reflected in threshold values, and the threshold values are adjusted such that the set of reel strips 614*a*-614*e* has a greater probability of being selected than either of the set of reel strips 414*a*-414*e* or the set of reel strips 514-514*e*. Although the thresholds shown in Table 3 are similar to the thresholds shown in Table 2 for the PIC symbols, this is for example only and different thresholds may be used to adjust the weighting of the lookup table.

TABLE 3

| Example Lookup Table for Reel Strip Set RNG Pull | |
|---|---|
| Count Value | Entry |
| 50 | < reel strips 614a-614e > |
| 15 | < reel strips 414a-414e > |
| 35 | < reel strips 514a-514e > |

In the example shown in Table 3, each entry indicates the set of reel strips selected based on the lookup operation. The entry may also define the number of the PIC symbol associated with the selected set of reel strips to be included on each reel strip. For example, the entry for the reel strips 614*a*-614*e* may also define the number of timber wolf PIC symbols 616 that are included on each of the reel strips 614*a*-614*e*. Likewise, the entries for the reel strips 414*a*-414*e* and 514*a*-514*e* also indicate the number of the respective PIC symbol that are included on each of the reel strips 414*a*-414*e* and 514*a*-514*e*, respectively. In this regard, further control may be facilitated, in particular by further controlling the probability that an all-ways pay winning symbol combination will be formed by instances of the PIC symbol associated with the selected set of reel strips. As above, this may be balanced with the probability that a set of reel strips including a PIC symbol associated with the all-ways pay evaluation will be selected by the reel strip set RNG pull. For example, the number of the buffalo PIC symbol 416 included on the reel strips 414*a*-414*e* may be increased relative to the number of the lion PIC symbol 516 included on the reel strips 514*a*-514*e* given that the set of reel strips 414*a*-414*e* has a lower probability of being selected. Furthermore, and as above, the sets of reel strips may include different numbers of the respective PIC symbol, both to vary the total number of the PIC symbol included on the reel strips and the number of instances of stacks of the PIC symbol on each of the sets of reel strips, to further control payout volatility and RTP rate.

With reference to Tables 2 and 3, multiple entries for a single PIC symbol, or multiple entries for sets of reel strips that include the same PIC symbol, may be included to facilitate controlling randomness, payout volatility, and RTP rate, while also enabling improved usability and enhanced user experience. For example, in Table 2, each of the buffalo PIC symbol 416, the lion PIC symbol 516, and/or the timber wolf PIC symbol 616 may include multiple entries. Each entry for each respective PIC symbol may adjust the probability of the PIC symbol being selected and the number of the PIC symbol that is included on the set of reel strips used for the reel game 400. Similarly, in Table 3, multiple entries for each of the reel strips 414*a*-414*e*, the reel strips 514*a*-514*e*, and/or the reel strips 614*a*-614*e* may be included. Each entry for each respective set of reel strips may adjust the probability of the set of reel strips being selected and the number of the PIC symbol included on each of the reel strips of the respective set. Providing multiple entries for each PIC symbol and/or set of reel strips in the respective lookup tables used for the RNG pulls enables more discrete variations in the number of winning symbol combinations that are generated between instances of the reel game 400 to further enhance user experience, while controlling randomness, payout volatility, and RTP rate.

Example Computer-Implemented Process for Randomly Selecting From Multiple Sets of Winning Symbol Combinations.

Figure 7:
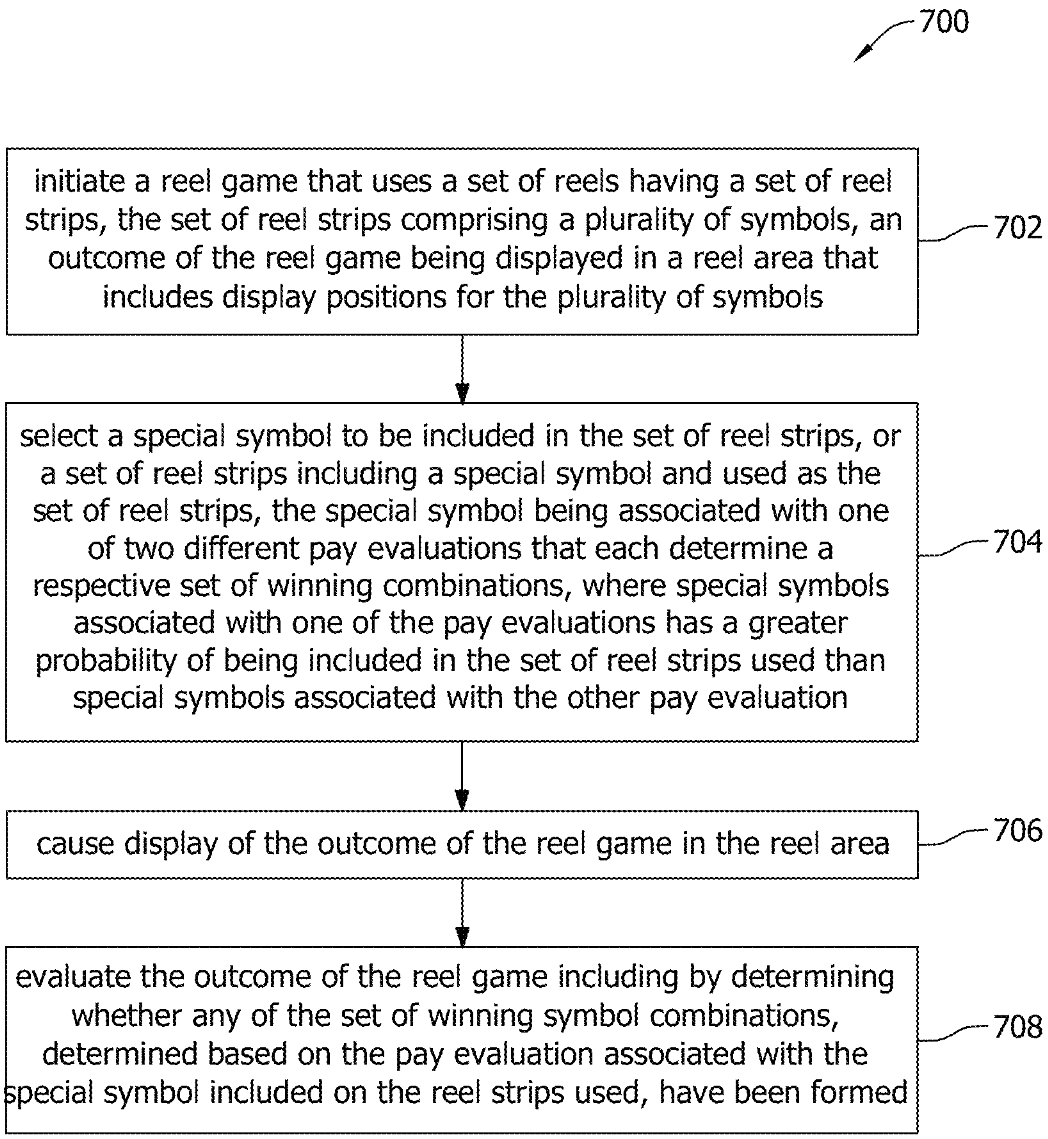
FIG. 7 illustrates a block diagram of an example computer-implemented method for randomly selecting a set of winning symbol combinations from multiple sets of winning symbol combinations for a reel game instance.

With reference to FIG. 7, an example computer-implemented method 700 for randomly selecting a set of winning symbol combinations from multiple sets of winning combinations for a game instance is shown. The example method 700 may be implemented in a server (e.g., server 102) and/or a gaming device (e.g., gaming devices 104A-104X in FIG. 1, and/or gaming device 200 and/or mobile gaming device 256 in FIG. 2). For example, in an electronic gaming device, a game controller (e.g., game controller 202) includes one or more processors 204 operatively coupled to memory 208. The memory 208 may store one or more game programs 206 that provide program instructions and/or data for carrying out various implementations (e.g., game mechanics) that, when executed by the processor 204, cause the processor 204 to perform certain operations to perform the method 700.

The method 700 includes, at a step 702, initiating a reel game (e.g., reel game 400) that uses a set of reels (e.g., reels 412) having a set of reel strips (e.g., reel strips 414*a*-414*e*, reel strips 514*a*-514*e*, and/or reel strips 614*a*-614*e*). The set of reel strips includes a plurality of symbols. An outcome of the reel game is displayed in a reel area (e.g., reel area 408) that includes display positions for the plurality of symbols.

At a step 704, the method 700 includes selecting a special symbol (e.g., buffalo PIC symbol 416, lion PIC symbol 516, and/or timber wolf PIC symbol 616) that is included in the plurality of symbols of the set of reel strips and common among each of the reel strips. Selecting the special symbol may include selecting a set of reel strips that includes the special symbol. The special symbol is selected from a plurality of special symbols, or the set of reel strips that includes the special symbol is selected from a plurality of sets of reel strips that each include one of the plurality of special symbols. Each of the plurality of special symbols is associated with a pay evaluation that determines a set of winning symbol combinations formed, at least in part, by one or more instances of the respective special symbol in the display positions during the outcome of the reel game. A first set of the plurality of special symbols is associated with a first pay evaluation and a second set of the plurality of special symbols is associated with a second pay evaluation that is different from the first pay evaluation. Specifically, the second pay evaluation determines a greater number of winning symbol combinations than the first pay evaluation. For example, the plurality of special symbols include special symbols associated with a lines pay evaluation and special symbols associated with an all-ways pay evaluation. Special symbols associated with the first pay evaluation (e.g., a lines pay evaluation) have a greater probability of being selected than special symbols associated with the second pay evaluation (e.g., an all-ways pay evaluation).

Selecting the special symbol at the step 704 may include generating a special symbol RNG pull in which a random number is generated and a lookup operation is performed for the random number in a lookup table (e.g., Table 2) that includes an entry for each of the plurality of special symbols. The lookup table used for the special symbol RNG pull may be weighted such that special symbols associated with the first pay evaluation (e.g., a lines pay evaluation) have a greater probability of being selected than special symbols associated with the second pay evaluation (e.g., an all-ways pay evaluation). Additionally or alternatively, the entry for each of the plurality of special symbols in the lookup table for the special symbol RNG pull may include a number of the respective special symbol to be included in the set of reel strips when selected. The number of the respective special symbol corresponds to a probability that any of the set of winning combinations, determined based on the pay evaluation associated with the respective special symbol, will be formed. Moreover, the entries for special symbols associated with the second pay evaluation (e.g., an all-ways pay evaluation) may include varying numbers of the special symbols to be included on the set of reel strips to vary the RTP rate between reel game instances that include the special symbols associated with the second pay evaluation. Moreover, the set of reel used for the reel game may have a single set of reel strips, where the reel strips include dynamic symbols that are populated (e.g., changed) to the selected PIC symbol.

Selecting the special symbol at the step 704 may additionally or alternatively include selecting a set of reel strips used for the set of reels from a plurality of sets of reel strips. Each of the plurality of sets of reel strips includes one of the plurality of special symbols included in the plurality of symbols and common among each of the reel strips of the respective set of reel strips. As above, the plurality of special symbols include special symbols associated with a first pay evaluation (e.g., a lines pay evaluation) and special symbols associated with a second, different pay evaluation (e.g., an all-ways pay evaluation). Sets of reel strips that each include one of the special symbols associated with the first pay evaluation have a greater probability of being selected than sets of reel strips that each include one of the special symbols associated with the second pay evaluation.

Selecting the set of reel strips may include generating a reel strip set RNG pull in which a random number is generated and a lookup operation is performed for the random number in a lookup table (e.g., Table 3) that includes an entry for each of the plurality of sets of reel strips. The lookup table is weighted such that sets of reel strips that each include one of the special symbols associated with the first pay evaluation have a greater probability of being selected than sets of reel strips that each include one of the special symbols associated with the second pay evaluation. The plurality of sets of reel strips may include multiple (at least two) sets of reel strips that each include a special symbol associated with the first pay evaluation (e.g., a lines pay evaluation) and multiple (at least two) sets of reel strips that each include a special symbol associated with the second pay evaluation (e.g., an all-ways pay evaluation). The entry for each of the plurality of sets of reel strips includes a number of the respective special symbol to be included in the set of reel strips. The number of the respective special symbol corresponds to a probability that any of the set of winning combinations, determined based on the pay evaluation associated with the respective special symbol, will be formed. The entries for the at least two sets of reel strips that each include a special symbol associated with the second pay evaluation may include a different number of the special symbol to be included in the set of reel strips, where the number varies to control a return-to-player rate for the reel game in which any of the at least two sets of reel strips that each include the special symbol associated with the all-ways pay evaluation is the selected set of reel strips. Additionally or alternatively, the entry for each of the at least two sets of reel strips that each include one of the special symbols associated with the second pay evaluation may include a number of instances of stacks of the respective special symbol included in the set of reel strips that is adjusted to control a return-to-player rate for the reel game.

The method 700 also includes, at a step 706, causing display of the outcome of the reel game in the reel area, and, at a step 708, evaluating the outcome of the reel game. The evaluation includes determining whether any of the set of winning symbol combinations, determined based on the pay evaluation associated with the selected special symbol, have been formed.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software may be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

a memory; and a processor configured to execute instructions stored in the memory, which when executed, cause the processor to:

initiate a reel game that uses a set of reels having a set of reel strips, the set of reel strips comprising a plurality of symbols, an outcome of the reel game being displayed in a reel area that includes display positions for the plurality of symbols;

select a special symbol that is included in the plurality of symbols of the set of reel strips and common among each of the reel strips, the special symbol being selected from a plurality of special symbols, each of the plurality of special symbols being associated with a pay evaluation that determines a set of winning symbol combinations formed, at least in part, by one or more instances of the respective special symbol in the display positions during the outcome of the reel game, the plurality of special symbols including a first set of special symbols associated with a first pay evaluation and a second set of special symbols associated with a second pay evaluation that determines a greater number of winning symbol combinations than the first pay evaluation, wherein special symbols of the first set have a greater probability of being selected than special symbols of the second set, and wherein the set of reels used for the reel game has a single set of reel strips that includes dynamic symbols, wherein the dynamic symbols are populated to the selected special symbol;

cause display of the outcome of the reel game in the reel area; and evaluate the outcome of the reel game including by determining whether any of the set of winning symbol combinations, determined based on the pay evaluation associated with the selected special symbol, have been formed.

2. The electronic gaming system of claim 1, wherein each of the first set of special symbols is associated with a lines pay evaluation and each of the second set of special symbols is associated with an all-ways pay evaluation.

3. The electronic gaming system of claim 1, wherein the instructions, when executed, further cause the processor to select the special symbol from the plurality of special symbols by:

generating a random number using a random number generator (RNG); and performing a lookup operation for the random number in a lookup table that includes an entry for each of the plurality of special symbols, the lookup table being weighted such that the special symbols of the first set have a greater probability of being selected than the special symbols of the second set.

4. The electronic gaming system of claim 3, wherein the entry for each of the plurality of special symbols includes a number of the respective special symbol to be included in the set of reel strips, the number of the respective special symbol corresponding to a probability that any of the set of winning combinations, determined based on the pay evaluation associated with the respective special symbol, will be formed, and the entry for each special symbol of the second set includes a number of the respective special symbol that is different than that of the other entries for the other special symbols of the second set.

5. The electronic gaming system of claim 1, wherein the instructions, when executed, further cause the processor to select the special symbol from the plurality of special symbols by selecting the set of reel strips for the set of reels from a plurality of sets of reel strips, each of the plurality of sets of reel strips including one of the plurality of special symbols included in the plurality of symbols and common among each of the reel strips of the respective set of reel strips, the plurality of sets of reel strips including one or more sets of reel strips that each include one of the special symbols associated with the first pay evaluation and one or more sets of reel strips that each include one of the special symbols associated with the second pay evaluation, wherein the one or more sets of reel strips that each include one of the special symbols associated with the first pay evaluation have a greater probability of being selected than the one or more sets of reel strips that each include one of the special symbols associated with the second pay evaluation.

6. The electronic gaming system of claim 5, the first pay evaluation is an all-ways pay evaluation.

7. The electronic gaming system of claim 6, wherein the second pay evaluation is a lines pay evaluation.

8. The electronic gaming system of claim 5, wherein the instructions, when executed, further cause the processor to select the set of reel strips from the plurality of sets of reel strips by:

generating a random number using a random number generator (RNG); and performing a lookup operation for the random number in a lookup table that includes an entry for each of the plurality of sets of reel strips, the lookup table being weighted such that the one or more sets of reel strips that each include one of the special symbols associated with the first pay evaluation have a greater probability of being selected than the one or more sets of reel strips that each include one of the special symbols associated with the second pay evaluation.

9. The electronic gaming system of claim 8, wherein the plurality of sets of reel strips includes at least two sets of reel strips that each include one of the special symbols associated with the first pay evaluation and at least two sets of reel strips that each include one of the special symbols associated with the second pay evaluation.

10. The electronic gaming system of claim 9, wherein the entry for each of the plurality of sets of reel strips includes a number of the respective special symbol to be included in the set of reel strips, the number of the respective special symbol corresponding to a probability that any of the set of winning combinations, determined based on the pay evaluation associated with the respective special symbol, will be formed.

11. The electronic gaming system of claim 10, wherein the at least two sets of reel strips that each include one of the special symbols associated with the second pay evaluation include a first set of reel strips and a second set of reel strips, and wherein the entry for the first set of reel strips includes a number of one of the special symbols associated with the second pay evaluation that is different from a number of one of the special symbols associated with the second pay evaluation included in the entry for the second set of reel strips.

12. The electronic gaming system of claim 10, wherein the number of one of the special symbols associated with the second pay evaluation included in the entry for each of the at least two sets of reel strips that each include one of the special symbols associated with the second pay evaluation is adjusted to control a return-to-player rate for the reel game.

13. The electronic gaming system of claim 9, wherein the entry for each of the at least two sets of reel strips that each include one of the special symbols associated with the second pay evaluation includes a number of instances of stacks of the respective special symbol included in the set of reel strips that is adjusted to control a return-to-player rate for the reel game.

14. A non-transitory computer-readable medium containing instructions embodied thereon, which when executed by a processor, cause the processor to:

initiate a reel game that uses a set of reels having a set of reel strips, the set of reel strips comprising a plurality of symbols, an outcome of the reel game being displayed in a reel area that includes display positions for the plurality of symbols;

select a special symbol that is included in the plurality of symbols of the set of reel strips and common among each of the reel strips, the special symbol being selected from a plurality of special symbols, each of the plurality of special symbols being associated with a pay evaluation that determines a set of winning symbol combinations formed, at least in part, by one or more instances of the respective special symbol in the display positions during the outcome of the reel game, the plurality of special symbols including a first set of special symbols associated with a first pay evaluation and a second set of special symbols associated with a second pay evaluation that determines a greater number of winning symbol combinations than the first pay evaluation, wherein special symbols of the first set have a greater probability of being selected than special symbols of the second set, and wherein the set of reels used for the reel game has a single set of reel strips that includes dynamic symbols, wherein the dynamic symbols are populated to the selected special symbol;

generate the outcome of the reel game to be displayed in the reel area; and evaluate the outcome of the reel game including by determining whether any of the set of winning symbol combinations, determined based on the pay evaluation associated with the selected special symbol, have been formed.

15. The non-transitory computer-readable medium of claim 14, wherein each of the first set of special symbols is associated with a lines pay evaluation and each of the second set of special symbols is associated with an all-ways pay evaluation.

16. The non-transitory computer-readable medium of claim 14, wherein the instructions, when executed, further cause the processor to select the special symbol from the plurality of special symbols by selecting the set of reel strips for the set of reels from a plurality of sets of reel strips, each of the plurality of sets of reel strips including one of the plurality of special symbols included in the plurality of symbols and common among each of the reel strips of the respective set of reel strips, the plurality of sets of reel strips including one or more sets of reel strips that each include one of the special symbols associated with the first pay evaluation and one or more sets of reel strips that each include one of the special symbols associated with the second pay evaluation, wherein the one or more sets of reel strips that each include one of the special symbols associated with the first pay evaluation have a greater probability of being selected than the one or more sets of reel strips that each include one of the special symbols associated with the second pay evaluation.

17. The non-transitory computer-readable medium of claim 16, wherein the instructions, when executed, further cause the processor to select the set of reel strips from the plurality of sets of reel strips by:

generating a random number using a random number generator (RNG); and performing a lookup operation for the random number in a lookup table that includes an entry for each of the plurality of sets of reel strips, the lookup table being weighted such that the one or more sets of reel strips that each include one of the special symbols associated with the first pay evaluation have a greater probability of being selected than the one or more sets of reel strips that each include one of the special symbols associated with the second pay evaluation.

18. A computer-implemented method for providing a game on an electronic gaming system, the method comprising:

initiating a reel game that uses a set of reels having a set of reel strips, the set of reel strips comprising a plurality of symbols, an outcome of the reel game being displayed in a reel area that includes display positions for the plurality of symbols;

selecting a special symbol that is included in the plurality of symbols of the set of reel strips and common among each of the reel strips, the special symbol being selected from a plurality of special symbols, each of the plurality of special symbols being associated with a pay evaluation that determines a set of winning symbol combinations formed, at least in part, by one or more instances of the respective special symbol in the display positions during the outcome of the reel game, the plurality of special symbols including a first set of special symbols associated with a first pay evaluation and a second set of special symbols associated with a second pay evaluation that determines a greater number of winning symbol combinations than the first pay evaluation, wherein special symbols of the first set have a greater probability of being selected than special symbols of the second set, and wherein the set of reels used for the reel game has a single set of reel strips that includes dynamic symbols, wherein the dynamic symbols are populated to the selected special symbol;

generating the outcome of the reel game to be displayed in the reel area; and evaluating the outcome of the reel game including by determining whether any of the set of winning symbol combinations, determined based on the pay evaluation associated with the selected special symbol, have been formed.

19. The method of claim 18, wherein each of the first set of special symbols is associated with a lines pay evaluation and each of the second set of special symbols is associated with an all-ways pay evaluation.

* * * * *